United States Patent
Chen et al.

(10) Patent No.: US 11,053,828 B2
(45) Date of Patent: Jul. 6, 2021

(54) SEPARATELY DETERMINING FIRING DENSITY AND PUMPING DENSITY DURING FIRING DENSITY TRANSITIONS FOR A LEAN-BURN INTERNAL COMBUSTION ENGINE

(71) Applicant: Tula Technology, Inc., San Jose, CA (US)

(72) Inventors: Shikui Kevin Chen, San Jose, CA (US); Matthew A. Younkins, San Jose, CA (US); Louis J. Serrano, Los Gatos, CA (US)

(73) Assignees: Tula Technology, Inc., San Jose, CA (US); Cummins Inc., Columbus, IN (US)

( * ) Notice: Subject to any disclaimer, the term of this patent is extended or adjusted under 35 U.S.C. 154(b) by 5 days.

(21) Appl. No.: 16/576,972

(22) Filed: Sep. 20, 2019

(65) Prior Publication Data

US 2020/0025050 A1 Jan. 23, 2020

Related U.S. Application Data

(63) Continuation-in-part of application No. 16/373,364, filed on Apr. 2, 2019, now Pat. No. 10,823,029, (Continued)

(51) Int. Cl.
*F01N 3/20* (2006.01)
*F02D 41/00* (2006.01)
(Continued)

(52) U.S. Cl.
CPC .......... *F01N 3/2033* (2013.01); *F01N 3/021* (2013.01); *F01N 3/0814* (2013.01);
(Continued)

(58) Field of Classification Search
CPC ...... F01N 3/2033; F01N 11/005; F01N 3/021; F01N 13/009; F01N 3/0814;
(Continued)

(56) References Cited

U.S. PATENT DOCUMENTS

| | | |
|---|---|---|
| 4,434,767 A | 3/1984 | Kohama et al. |
| 4,489,695 A | 12/1984 | Kohama et al. |

(Continued)

FOREIGN PATENT DOCUMENTS

| | | |
|---|---|---|
| WO | WO2007/100438 | 9/2007 |
| WO | WO 2010/006311 | 1/2010 |
| WO | WO 2011/085383 | 7/2011 |

OTHER PUBLICATIONS

U.S. Office Action dated Jul. 10, 2020 from U.S. Appl. No. 16/373,364.
(Continued)

*Primary Examiner* — Matthew T Largi
(74) *Attorney, Agent, or Firm* — Beyer Law Group LLP

(57) ABSTRACT

A skip fire engine controller and method of control is described wherein during transitions from a first firing density to a second firing density, a firing density and a pumping density are separately set so as to balance the conflicting demands of (a) torque control, (b) Noise, Vibration and Harshness (NVH), (c) air flow through the engine and (d) air-fuel ratio.

40 Claims, 18 Drawing Sheets

US 11,053,828 B2
Page 2

Related U.S. Application Data which is a continuation-in-part of application No. 16/275,881, filed on Feb. 14, 2019, now Pat. No. 10,494,971, which is a continuation of application No. 15/347,562, filed on Nov. 9, 2016, now Pat. No. 10,247,072.

(60) Provisional application No. 62/250,049, filed on Nov. 11, 2015.

(51) Int. Cl.
| | |
|---|---|
| *F01N 11/00* | (2006.01) |
| *F01N 3/021* | (2006.01) |
| *F02D 41/40* | (2006.01) |
| *F01N 13/00* | (2010.01) |
| *F01N 3/08* | (2006.01) |

(52) U.S. Cl.
CPC .......... *F01N 3/2066* (2013.01); *F01N 11/005* (2013.01); *F01N 13/009* (2014.06); *F02D 41/0087* (2013.01); *F02D 41/401* (2013.01); *F01N 2430/08* (2013.01); *F01N 2900/08* (2013.01); *F01N 2900/1404* (2013.01); *F01N 2900/1602* (2013.01); *F02D 2041/0012* (2013.01); *F02D 2200/0802* (2013.01); *F02D 2200/0804* (2013.01); *Y02T 10/12* (2013.01); *Y02T 10/40* (2013.01)

(58) Field of Classification Search
CPC .......... F01N 3/2066; F01N 2900/1404; F01N 2900/08; F01N 2900/1602; F01N 2430/08; F01N 13/082; F01N 9/00; F01N 3/2006; F02D 41/0007; F02D 41/005; F02D 41/0087; F02D 41/401; F02D 41/1446; F02D 13/06; F02D 41/029; F02D 2250/18; F02D 2250/21; F02D 2041/0012; F02D 2200/0802; F02D 2200/0804

See application file for complete search history.

(56) References Cited

U.S. PATENT DOCUMENTS

| | | | |
|---|---|---|---|
| 4,509,488 A * | 4/1985 | Forster | F02P 9/002 |
| | | | 123/198 F |
| 4,552,114 A | 11/1985 | Sano et al. | |
| 5,377,631 A | 1/1995 | Schechter | |
| 5,410,876 A | 5/1995 | Simko | |
| 5,483,941 A | 1/1996 | Cullen et al. | |
| 5,553,575 A | 9/1996 | Beck et al. | |
| 5,768,887 A | 6/1998 | Nakamura et al. | |
| 5,826,563 A | 10/1998 | Patel et al. | |
| 5,945,597 A | 8/1999 | Poublan et al. | |
| 6,158,411 A | 12/2000 | Morikawa | |
| 6,257,207 B1 | 7/2001 | Inui et al. | |
| 6,273,076 B1 | 8/2001 | Beck et al. | |
| 6,314,735 B1 | 11/2001 | Kolmanovsky et al. | |
| 6,405,705 B1 | 6/2002 | Dunsworth | |
| 6,415,601 B1 | 7/2002 | Glugla et al. | |
| 6,619,258 B2 | 9/2003 | McKay et al. | |
| 6,732,506 B2 | 5/2004 | Patterson et al. | |
| 6,769,398 B2 | 8/2004 | Surnilla et al. | |
| 6,978,204 B2 | 12/2005 | Surnilla et al. | |
| 7,032,572 B2 | 4/2006 | Bidner et al. | |
| 7,032,581 B2 | 4/2006 | Gibson et al. | |
| 7,063,062 B2 | 6/2006 | Lewis et al. | |
| 7,066,136 B2 | 6/2006 | Ogiso et al. | |
| 7,069,903 B2 | 7/2006 | Surnilla et al. | |
| 7,069,910 B2 | 7/2006 | Surnilla et al. | |
| 7,086,386 B2 | 8/2006 | Doering | |
| 7,124,717 B2 | 10/2006 | Gaessler et al. | |
| 7,165,391 B2 | 1/2007 | Lewis | |
| 7,165,520 B2 | 1/2007 | Lewis et al. | |
| 7,503,312 B2 | 3/2009 | Surnilla et al. | |
| 7,854,114 B2 | 12/2010 | England | |
| 7,930,087 B2 | 4/2011 | Gibson et al. | |
| 7,931,002 B1 | 4/2011 | Gibson et al. | |
| 8,099,224 B2 | 1/2012 | Tripathi et al. | |
| 8,131,445 B2 * | 3/2012 | Tripathi | F02D 41/1401 |
| | | | 701/102 |
| 8,225,771 B2 | 7/2012 | Aso et al. | |
| 8,689,541 B2 | 4/2014 | McDonald et al. | |
| 8,886,422 B2 | 11/2014 | Sujan et al. | |
| 8,892,330 B2 | 11/2014 | Yuille et al. | |
| 8,931,255 B2 | 1/2015 | Wilson | |
| 9,086,020 B2 | 7/2015 | Pirjaberi et al. | |
| 9,267,454 B2 | 2/2016 | Wilcutts et al. | |
| 9,399,964 B2 | 7/2016 | Younkins et al. | |
| 9,664,130 B2 | 5/2017 | Wilcutts et al. | |
| 9,726,094 B2 | 8/2017 | Younkins et al. | |
| 9,964,051 B2 | 5/2018 | Pirjaberi et al. | |
| 10,161,325 B2 | 12/2018 | Zur Loye et al. | |
| 2002/0073696 A1 | 6/2002 | Kuenstler et al. | |
| 2002/0116917 A1 | 8/2002 | Glugla et al. | |
| 2003/0010016 A1 | 1/2003 | Beer et al. | |
| 2003/0121249 A1 * | 7/2003 | Foster | B60H 1/12 |
| | | | 60/285 |
| 2003/0187565 A1 | 10/2003 | Wong et al. | |
| 2003/0221655 A1 | 12/2003 | Surnilla et al. | |
| 2004/0118116 A1 | 6/2004 | Beck et al. | |
| 2004/0206071 A1 | 10/2004 | Glugla et al. | |
| 2004/0237514 A1 | 12/2004 | Surnilla et al. | |
| 2004/0255576 A1 * | 12/2004 | Brown | F02D 17/02 |
| | | | 60/285 |
| 2006/0130459 A1 | 6/2006 | Warner et al. | |
| 2007/0051092 A1 | 3/2007 | Pallett et al. | |
| 2007/0051350 A1 | 3/2007 | Pallet et al. | |
| 2009/0301060 A1 | 12/2009 | Kennie et al. | |
| 2010/0006065 A1 | 1/2010 | Tripathi et al. | |
| 2010/0047792 A1 | 2/2010 | Szendro et al. | |
| 2010/0050993 A1 | 3/2010 | Zhao et al. | |
| 2010/0186384 A1 | 7/2010 | Gonze et al. | |
| 2011/0048372 A1 | 3/2011 | Dibble et al. | |
| 2011/0197860 A1 | 8/2011 | Aso et al. | |
| 2011/0253113 A1 | 10/2011 | Roth et al. | |
| 2011/0295489 A1 | 12/2011 | Ma et al. | |
| 2012/0042633 A1 * | 2/2012 | Silvestri | F02D 17/02 |
| | | | 60/274 |
| 2012/0046853 A1 | 2/2012 | Silvestri et al. | |
| 2012/0102920 A1 * | 5/2012 | Pipis, Jr. | F01N 3/103 |
| | | | 60/274 |
| 2012/0204827 A1 | 8/2012 | Sieber et al. | |
| 2013/0255626 A1 | 10/2013 | Serrano | |
| 2014/0041625 A1 | 2/2014 | Pirjaberi et al. | |
| 2014/0053802 A1 * | 2/2014 | Rayl | F02D 41/123 |
| | | | 123/350 |
| 2016/0115878 A1 | 4/2016 | VanDerWege | |
| 2016/0186672 A1 | 6/2016 | Mehrotra et al. | |
| 2017/0074185 A1 | 3/2017 | Reynolds et al. | |
| 2017/0130630 A1 | 5/2017 | Younkins et al. | |
| 2017/0159581 A1 | 6/2017 | McCarthy, Jr. et al. | |
| 2017/0342920 A1 | 11/2017 | Pirjaberi et al. | |
| 2017/0342922 A1 | 11/2017 | Pirjaberi et al. | |
| 2017/0370308 A1 | 12/2017 | Hashemi et al. | |
| 2018/0179973 A1 | 6/2018 | Tsuruoka | |
| 2019/0178135 A1 | 6/2019 | Younkins et al. | |
| 2019/0226378 A1 | 7/2019 | Chen et al. | |

OTHER PUBLICATIONS

International Search Report and Written Opinion dated Jul. 14, 2020 from International Application No. PCT/US 20/18313.
International Search Report dated Feb. 23, 2017 from International Application No. PCT/US2016/061139.
Written Opinion dated Feb. 23, 2017 from International Application No. PCT/US2016/061139.

(56) References Cited

OTHER PUBLICATIONS

International Preliminary Report on Patentability dated May 24, 2018 from International Application No. PCT/US2016/061139.

* cited by examiner

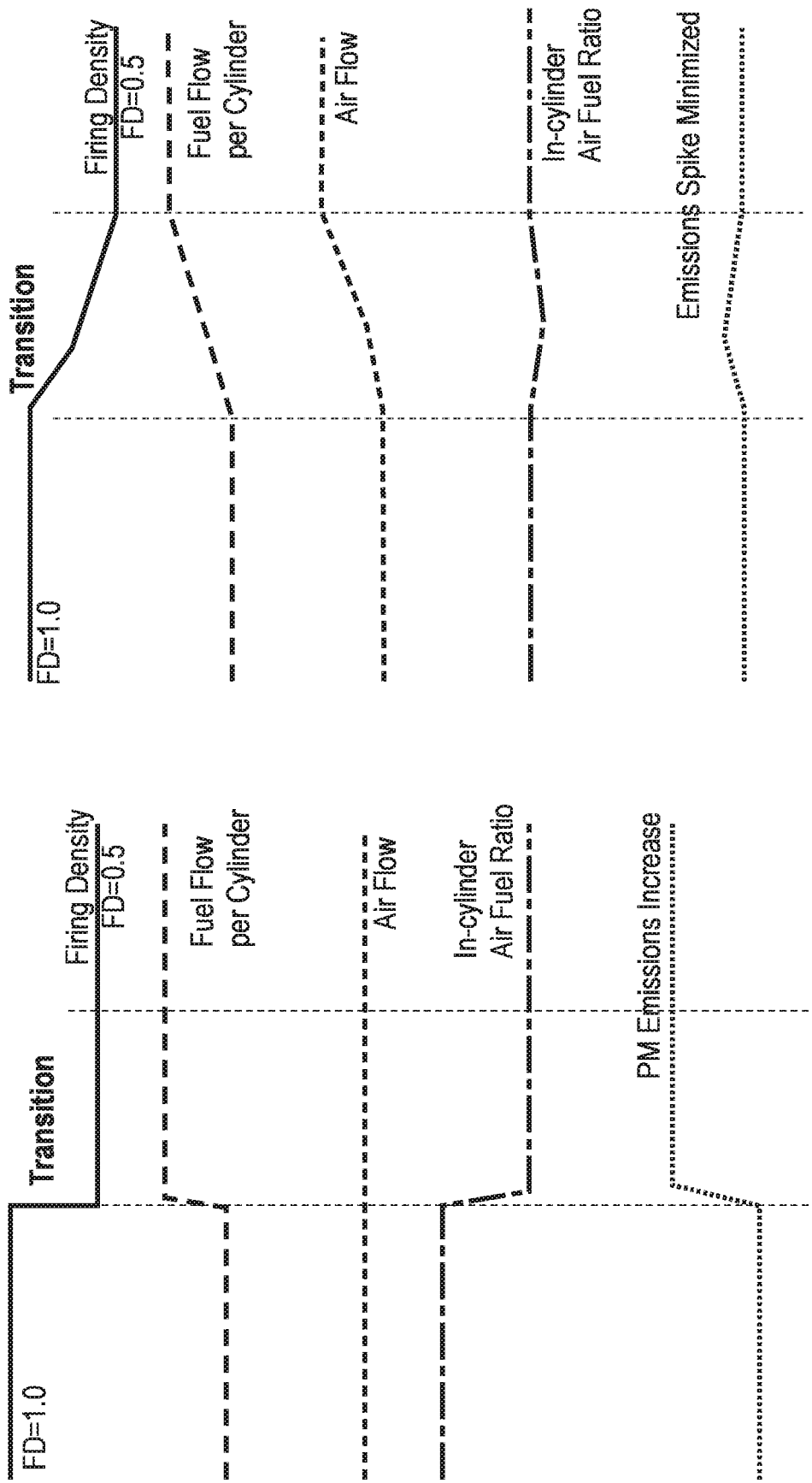

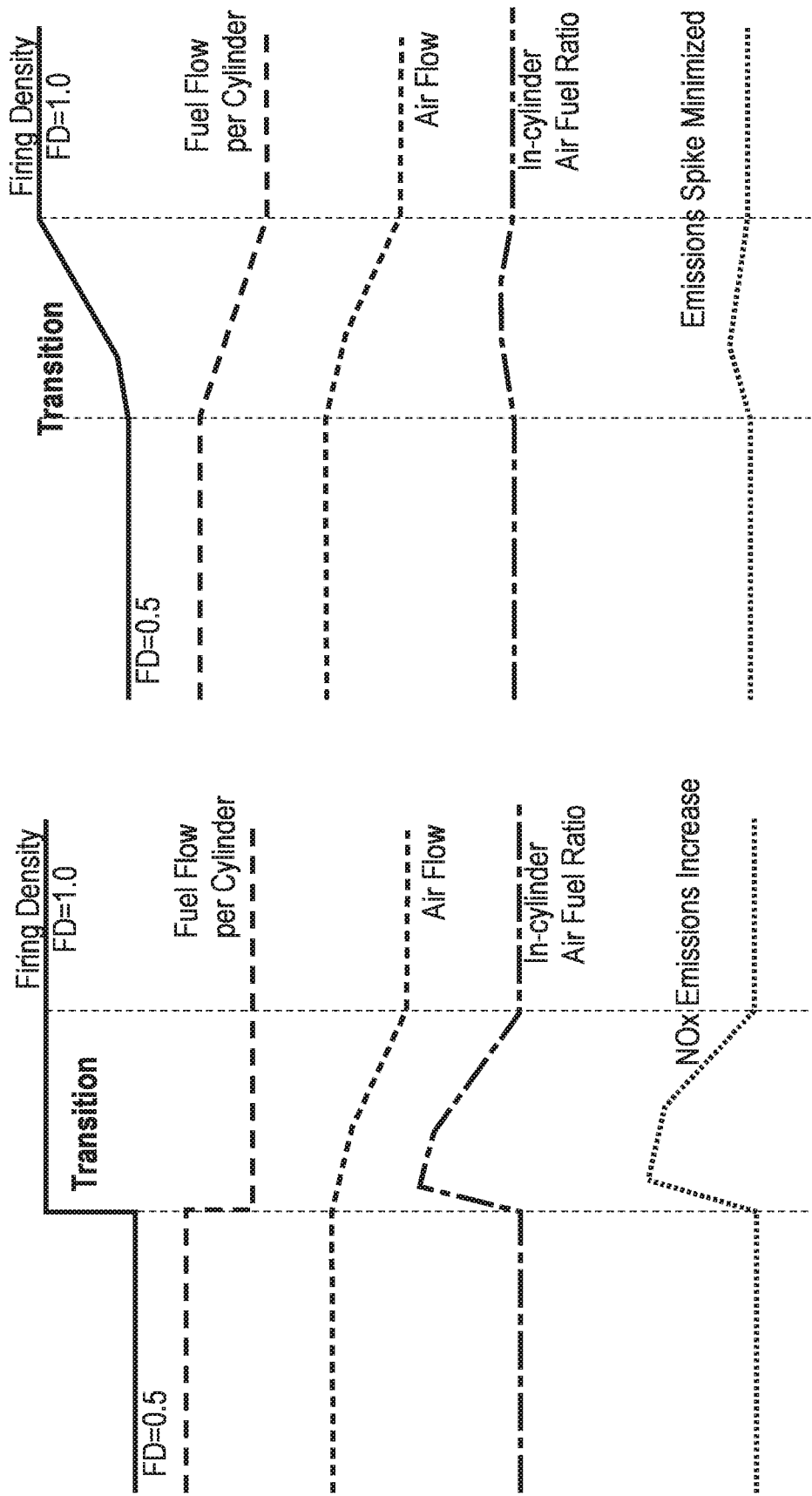

SEPARATELY DETERMINING FIRING DENSITY AND PUMPING DENSITY DURING FIRING DENSITY TRANSITIONS FOR A LEAN-BURN INTERNAL COMBUSTION ENGINE

CROSS REFERENCE TO RELATED APPLICATIONS

This application is a Continuation-in-Part of U.S. application Ser. No. 16/373,364 filed Apr. 2, 2019, which is a Continuation-in-Part of U.S. application Ser. No. 16/275,881, filed Feb. 14, 2019, which is a Continuation of U.S. application Ser. No. 15/347,562 (now U.S. Pat. No. 10,247,072, issued Apr. 2, 2019), filed on Nov. 9, 2016, which claims priority to U.S. Provisional Application No. 62/254,049, filed on Nov. 11, 2015. All the above listed applications are incorporated by reference herein in their entirety for all purposes.

FIELD OF THE INVENTION

The present invention relates to a skip fire engine control system for a lean burn internal combustion engine, and more specifically, to skip fire engine control wherein during transitions from a first firing density to a second firing density, a firing pattern and a pumping pattern are separately implemented so as to manage and balance the conflicting demands of (a) meeting the torque request, (b) preventing excessive Noise, Vibration and Harshness (NVH), (c) maintaining a proper air-fuel ratio and (d) controlling air flow through the engine.

BACKGROUND

Most vehicles in operation today are powered by internal combustion (IC) engines. Internal combustion engines typically have multiple working chambers (i.e., cylinders) where combustion occurs. The power generated by the engine depends on a combination of (a) the number of cylinders and (b) the amount of fuel and air that is delivered to each cylinder. During everyday driving, the engine of a vehicle typically operates over a wide range of torque demands and operating speeds to meet varying driving conditions.

There are two common types of IC engines; spark ignition (SI) engines and compression ignition engines. Both engine types typically use a cylinder as the working chamber with a piston that reciprocates within the cylinder forming an enclosed volume with variable size depending on the piston location. Air is inducted from an intake manifold into one or more cylinders thru an intake valve or valves by forcing the piston to expand the enclosed volume. The inducted air is then compressed by the piston moving so as to contract the enclosed volume. Combustion occurs within a contained volume of the cylinder at or near its minimum size. Expanding combustion gases push the piston outward expanding the enclosed volume and performing useful work. The piston in turn forces out exhaust gases from the enclosed volume into an exhaust manifold thru one or more exhaust valve(s).

With SI engines, combustion is initiated by a spark. That is, an air-fuel mixture is contained within the cylinder(s) of an engine and then a spark, typically from a spark-plug, is used to ignite the mixture.

Compression engines, on the other hand, rely on the pressure and temperature of the air-fuel mixture, not a spark, to initiate combustion. An air-fuel mixture is contained within the cylinder and combustion is caused by elevation of the mixture temperature by mechanical compression, resulting in spontaneous combustion of the fuel.

The air-fuel ratio in a cylinder is an important measure with both SI and compression-ignition type engines. If exactly enough air is provided to completely burn all the fuel without any remaining oxygen, the ratio is known as "stoichiometric".

Ratios lower than stoichiometric are considered "rich", meaning the ratio defines more fuel than can be burned by the provided amount of air. Rich mixtures can generate more power and burn cooler, but at the expense of efficiency.

Ratios higher than stoichiometric, on the other hand, are considered "lean", meaning the ratio defines an air-fuel mixture with more oxygen than can be combusted by the fuel. Lean air-fuel ratios do not effectively use common three-way catalysts in an exhaust aftertreatment system, since excess oxygen is typically present in the exhaust gas.

Spark ignition engines are generally operated with a stoichiometric fuel/air ratio and have their output torque controlled by controlling the mass air charge (MAC) in a cylinder. Mass air charge is generally controlled using a throttle to reduce the intake manifold absolute pressure (MAP). A spark ignition engine may also use a supercharger or turbocharger to boost the intake manifold pressure above atmospheric pressure.

Compression ignition engines typically control the engine output torque by controlling the amount of fuel injected (hence changing the air/fuel ratio), not air flow through the engine. Engine output torque is reduced by adding less fuel to the air entering the cylinder (i.e. running the engine leaner). Compression ignition engines generally run with a lean air/fuel ratio. For example, a Diesel engine, which is the most common type of compression-ignition engine, may typically operate with air/fuel ratios with a range of 16 to 55 compared to a stoichiometric air/fuel ratio of approximately 14.6. Some, usually older, Diesel engines generally do not use a throttle, and can instead use a turbocharger to control air flow into the engine. Compression ignition engines may also be further classified based on their fuel and how the fuel is mixed with air within the cylinder. Several common types of compression ignition engines include a stratified charge compression ignition engine (e.g., most conventional Diesel engines, and abbreviated as SCCI), a premixed charge compression ignition (PCCI) engine, a reactivity-controlled compression ignition (RCCI) engine, a gasoline compression ignition engines (GCI) engine, and a homogeneous charge compression ignition (HCCI) engine.

Both spark ignition and compression ignition engines require emission control systems including one or more aftertreatment elements to limit emissions of undesirable pollutants that are combustion byproducts.

Spark ignition engines generally use a 3-way catalyst that both oxidizes unburned hydrocarbons and carbon monoxide and reduces nitrous oxides ($NO_x$). These catalysts require that on average the engine combustion be at or near the stoichiometric air/fuel ratio, so that both oxidation and reduction reactions can occur.

Since compression ignition engines generally run lean, they cannot rely on a conventional 3-way catalyst to meet emissions regulations. Instead they use another type of aftertreatment device to reduce $NO_x$ emissions. These aftertreatment devices may use catalysts, lean $NO_x$ traps, and selective catalyst reduction (SCR) to reduce nitrous oxides to molecular nitrogen. Additionally, Diesel engines often require a particulate filter to reduce soot emissions.

Fuel efficiency of internal combustion engines can be substantially improved by varying the engine displacement.

This allows for the full torque to be available when required, yet can significantly reduce pumping losses and improve thermal efficiency by using a smaller displacement when full torque is not required.

The most common method today of implementing a variable displacement engine is to deactivate a group of cylinders substantially simultaneously. Commercially available variable displacement engines available today typically support only two or at most three displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then skipped during the next engine cycle and selectively skipped or fired during the next. From an engine cycle perspective, skip fire control may have different sets of cylinders fired during sequential engine cycles to generate the same average torque, whereas variable displacement operation deactivates the same set of cylinders. In this manner, even finer control of the effective engine displacement is possible. For example, firing every third cylinder in a 4-cylinder engine would provide an effective reduction to $\frac{1}{3}^{rd}$ of the full engine displacement, which is a fractional displacement that is not obtainable by simply deactivating a set of cylinders.

With skip fire engine control, selecting the correct firing density is a challenge. Using a low firing density to meet a given torque request is often fuel efficient; however, the engine may produce unacceptable levels of Noise, Vibration and Harshness (NVH). On the other hand, if the firing density is higher than necessary, engine efficiency may be reduced. Also, for compression ignition engines, pollutants in the engine's exhaust stream are dependent on the air-fuel ratio, which is impacted by the firing density. Firing density also impacts air flow through the engine, which may impact the efficacy of aftertreatment systems used to reduce tailpipe emissions.

Controlling the firing density through firing density transitions is also complicated by delays associated with adjusting the ratio of fresh air to recirculated exhaust gases in the intake manifold and the intake manifold pressure. More sophisticated methods for transitioning between different firing densities, which provide high levels of engine efficiency, acceptable levels of NVH, and low levels of exhaust stream pollutants, is therefore needed.

SUMMARY OF THE INVENTION

The present invention relates to an engine controller arranged to operate a lean burn internal combustion engine having a plurality of cylinders in a skip fire mode. During operation, the engine controller is often required to transition from a first firing fraction to a target firing fraction to meet changing torque requests. During such transitions, the engine controller has to deal with a number of conflicting demands, including meeting the requested torque request, preventing excessive Noise, Vibration and Harshness (NVH), maintaining a proper air-fuel ratio and controlling air flow through the internal combustion engine to avoid adversely affecting emissions.

With the present invention, the engine controller separately determines (a) a firing density or pattern and (b) a pumping density or pattern during transitions. With the defined firing density or pattern, NVH can be reduced while the torque request is met. With the defined pumping density or pattern, the rate of air and/or re-circulated exhaust gases pumped through the internal combustion engine is controlled, providing an ability to control the air-fuel ratio and emissions. Thus, by intermixing the firing and deactivation of cylinders with the pumping of un-fueled cylinders during transitions, the conflicting demands of meeting the torque demand, NVH, maintaining the proper air-fuel ratio and an ideal air flow through the engine can all balanced, resulting in a more optimal outcome for each.

In various non-exclusive embodiments, timing of starting and/or completing the firing density transition relative to the pumping density transition may be further controlled to meet specific operating conditions. For example:

1. When the first firing density is greater than the target firing density, the engine controller is arranged to transition the firing density from the first firing density to the target firing density faster (i.e., in less time) than transitioning the pumping density. By transitioning the firing density faster, NVH is reduced while meeting the torque demand By extending the transition in the pumping density, changes in air flow rate through the engine better match inherent time delays associated with changes in manifold intake pressure and exhaust gas recirculation rates allowing better control of the air-fuel ratio through the transition; or:
2. When the first firing density is less than the target firing density, the engine controller (i) first implements a change in pumping density and (ii) delays implementing a change in firing density until after the pumping density transition has started. Again, this results in a better control of the air-fuel ratio through the transition.

In yet other embodiments, each firing opportunity during a firing density transition may have an associated action consisting of either, firing a cylinder associated with the firing opportunity, causing the cylinder associated with the firing opportunity to pump air through the engine, or deactivating the cylinder associated with the firing opportunity. In some embodiments, a first sigma-delta converter and a second sigma-delta converter can be used select the action associated with any firing opportunity. In some embodiments, the first sigma-delta converter and a second sigma-delta converter generate a Fire-Enable flag and a Pump-Enable flag for each firing opportunity of the cylinders of the internal combustion engine respectively. If a firing opportunity has the Pump-Enable flag set and the Fire-Enable flag not set, then a cylinder associated with the firing opportunity will pump air through the engine without firing the cylinder.

In yet other embodiments, the internal combustion engine is any type of lean burn internal combustion engine, including but not limited to a compression-ignition engine and/or Diesel engine. In some embodiments, the engine is a gasoline-fueled lean burn engine.

BRIEF DESCRIPTION OF THE DRAWINGS

The invention and the advantages thereof, may best be understood by reference to the following description taken in conjunction with the accompanying drawings in which:

FIGS. 6A-6C are various diagrams illustrating how a spike in particulate emissions by the exemplary internal combustion engine is mitigated during transitions from a high firing density to a low firing density according to a non-exclusive embodiment of the present invention.

FIGS. 7A-7C are various diagrams illustrating how a spike in $NO_x$ emissions by the exemplary internal combustion engine is mitigated during transitions from a low firing density to a high firing density according to a non-exclusive embodiment of the present invention.

In the drawings, like reference numerals are sometimes used to designate like structural elements. It should also be appreciated that the depictions in the figures are diagrammatic and not to scale.

DETAILED DESCRIPTION

Figure 1A:
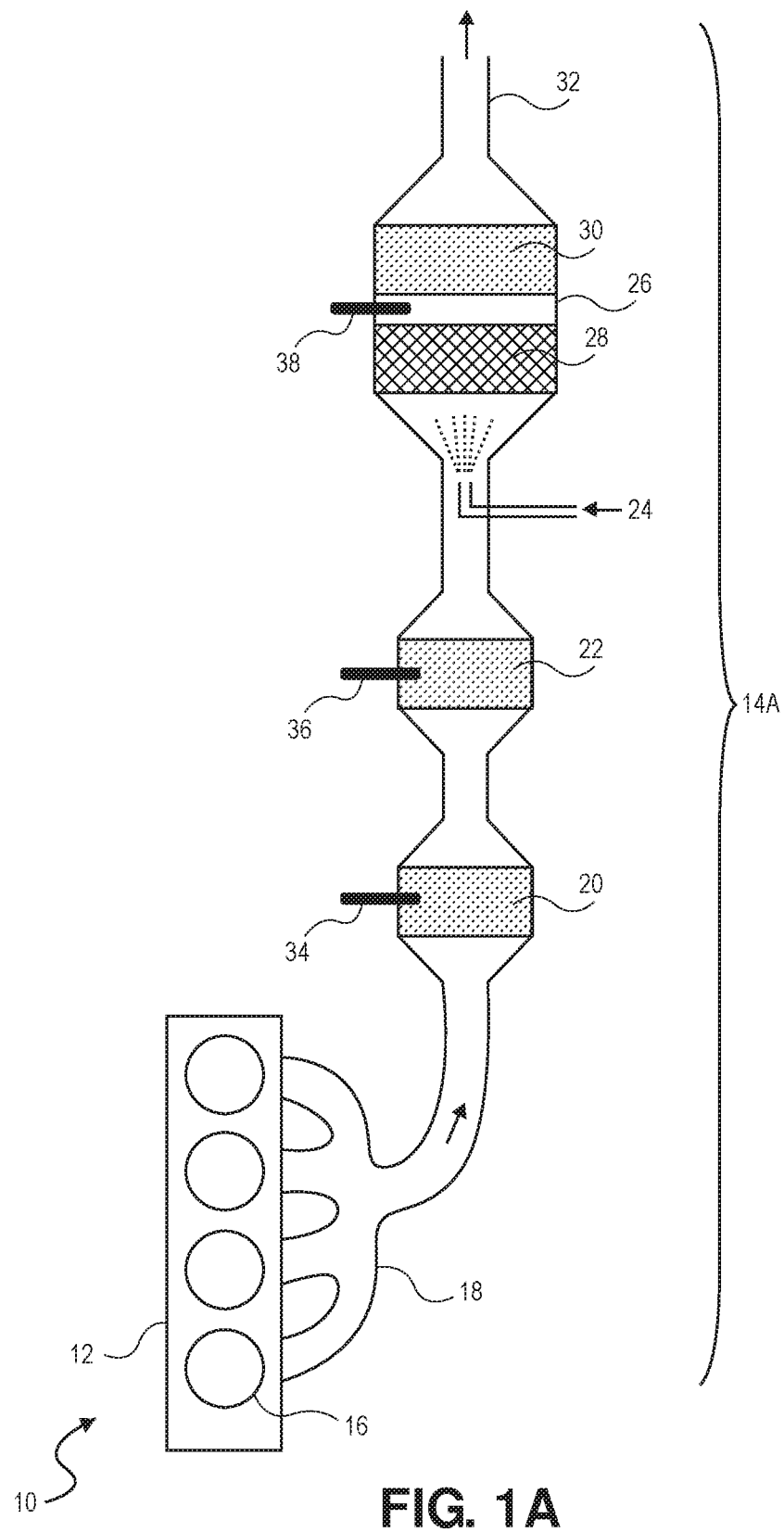
FIG. 1A is a schematic diagram of a representative engine exhaust system for an exemplary compression ignition engine.

The present invention relates to skip fire control that relies on a combination of a torque request, an exhaust temperature, an NVH level, and an air-fuel ratio in determining a firing density (FD) of an internal combustion engine. The internal combustion engine may be a lean burn engine and may be used to power a vehicle. In addition, the present invention also is directed to using different types of working chamber valve control during skipped firing opportunities that either allow or prevent pumping air through the engine to control and modulate exhaust gas temperature in aftertreatment systems.

Skip Fire Engine Control

Skip fire engine control contemplates selectively skipping the firing of certain cylinders during selected firing opportunities. Thus, for a given effective engine displacement that is less than the full displacement of the engine, a particular cylinder may be successively fired during one firing opportunity, skipped during the next firing opportunity and then selectively skipped or fired during the next firing opportunity. The firing sequence may be expressed as a firing density, which indicates a ratio of fired firing opportunities to total firing opportunities. Firing density may be expressed as a fraction, a percentage, or in some other manner With skip fire, much finer engine control is possible than by using only a fixed set of deactivated cylinders.

An issue with skip fire controlled engines is the possibility of unacceptable NVH associated with some firing sequences and cylinder loads. One approach to dealing with such issues is to not use particular firing densities or firing sequences that are known to produce unacceptable NVH levels. Instead, other firing densities or firing sequences are used and the cylinder output is adjusted accordingly (e.g., by adjusting the injected fuel mass into the cylinder) so that the desired engine output is delivered. Various approaches of this kind are described in co-assigned U.S. patent application Ser. No. 13/654,244, which is incorporated herein in its entirety for all purposes.

During normal driving, an engine typically must operate over a wide range of engine speeds and engine loads. To meet these changing operating conditions, a skip fire controlled engine may transition between various firing densities. For instance, a commercially available skip fire controller that provides for seventeen (17) different firing densities, each indicative of a different reduced effective engine displacement, is available. In contrast, with conventional variable displacement, a set of one or more cylinders are continuously fired, while a second set of one or more different cylinders are continually deactivated or skipped. For example, an 8-cylinder conventional variable displacement engine may deactivate blocks of cylinders (i.e. 2, 4 or 6 cylinders) so that it is operating using only the remaining (i.e., 6, 4 or 2) cylinders. With significantly more firing densities available, skip fire offers significantly more refined engine control compared to conventional variable displacement engine control.

Skip fire control generally operates based on firing opportunities, independent of any particular cylinder firing pattern. For each engine cycle, an internal combustion engine with a plurality cylinders operates in a predefined firing opportunity sequence. With a 6-cylinder engine, a cylinder firing opportunity sequence for example may be 1, 5, 3, 6, 2 and 4, where the numbers 1 through 6 correspond to a physical location of each cylinder in the engine. In skip fire control, a skip fire pattern or firing sequence can start or end on any particular cylinder.

Dynamic Skip Fire (DSF) Engine Control

With certain implementations of skip fire engine control, a decision to fire or not fire a given cylinder of an engine is made dynamically, meaning on a firing opportunity-by-firing opportunity basis. In other words, prior to each successive firing opportunity, a decision is made to either fire or skip the firing opportunity. In various embodiments, the firing sequence is determined on a firing opportunity by firing opportunity basis by using a sigma delta, or equivalently a delta sigma, converter. Such a skip fire control system may be defined as dynamic skip fire control. For more details on DSF, see U.S. Pat. Nos. 7,849,835, 9,086,020 and 9,200,575, and U.S. application Ser. No. 14/638,908, each incorporated by reference herein for all purposes.

Skip fire engine control, including DSF, can offer various advantages, including substantial improvements in fuel economy for spark ignition engines where pumping losses may be reduced by operating at higher average MAP levels. With compression ignition engines, skip fire control provides a means to control the engine exhaust gas temperature over a wide range of engine operating conditions. In particular, skip fire control may be used to modulate exhaust gas temperatures within a range where aftertreatment emission control systems can efficiently reduce tailpipe emissions. Various approaches of this kind are described in co-assigned U.S. patent application Ser. No. 15/347,562, which is incorporated herein in its entirety for all purposes. Use of skip fire control can also offer greater than a twenty percent (20%) improvement in fuel consumption efficiency in compression ignition engines at light loads, for example, loads less than 10% of the engine's maximum output.

Exemplary Lean Burn Engine and Exhaust Systems

FIG. 1A is a schematic diagram of an exemplary system 10 including an engine 12 and aftertreatment system 14A. In this embodiment, the particulate filter 20 is situated upstream of the reducing catalytic converter 26 and oxidizing catalytic converter 22. Such as arrangement may be particularly applicable to a gasoline-fueled lean burn engine.

The engine 12 includes a plurality of cylinders 16 where combustion occurs. In the embodiment shown, the engine 12 includes four (4) cylinders 16. It should be understood that the engine 12 as illustrated is merely exemplary and may include either fewer or more cylinders 16. In addition, the engine 12 can be a compression ignition engine, a spark-ignition (SI) engine, an engine that combines spark ignition with compression ignition, or an engine that ignites the air fuel mixture with a different technology. For the sake of simplicity, the discussion below of the operation of the engine 12 is largely within the context of a compression ignition engine, such as a Diesel engine. It should be understood, however, that many of the features discussed below are equally applicable to other types of engines, such as SI engines.

The exhaust system 14A may additionally include one or more temperature sensors. Such temperature sensors may include (a) a temperature sensor 34 to monitor the temperature of the particulate filter 20, (b) a temperature sensor 36 to monitor the temperature of oxidizing catalytic converter 22, and (c) a temperature sensor 38 to monitor the temperature of the reducing catalytic converter 26.

Figure 1B:
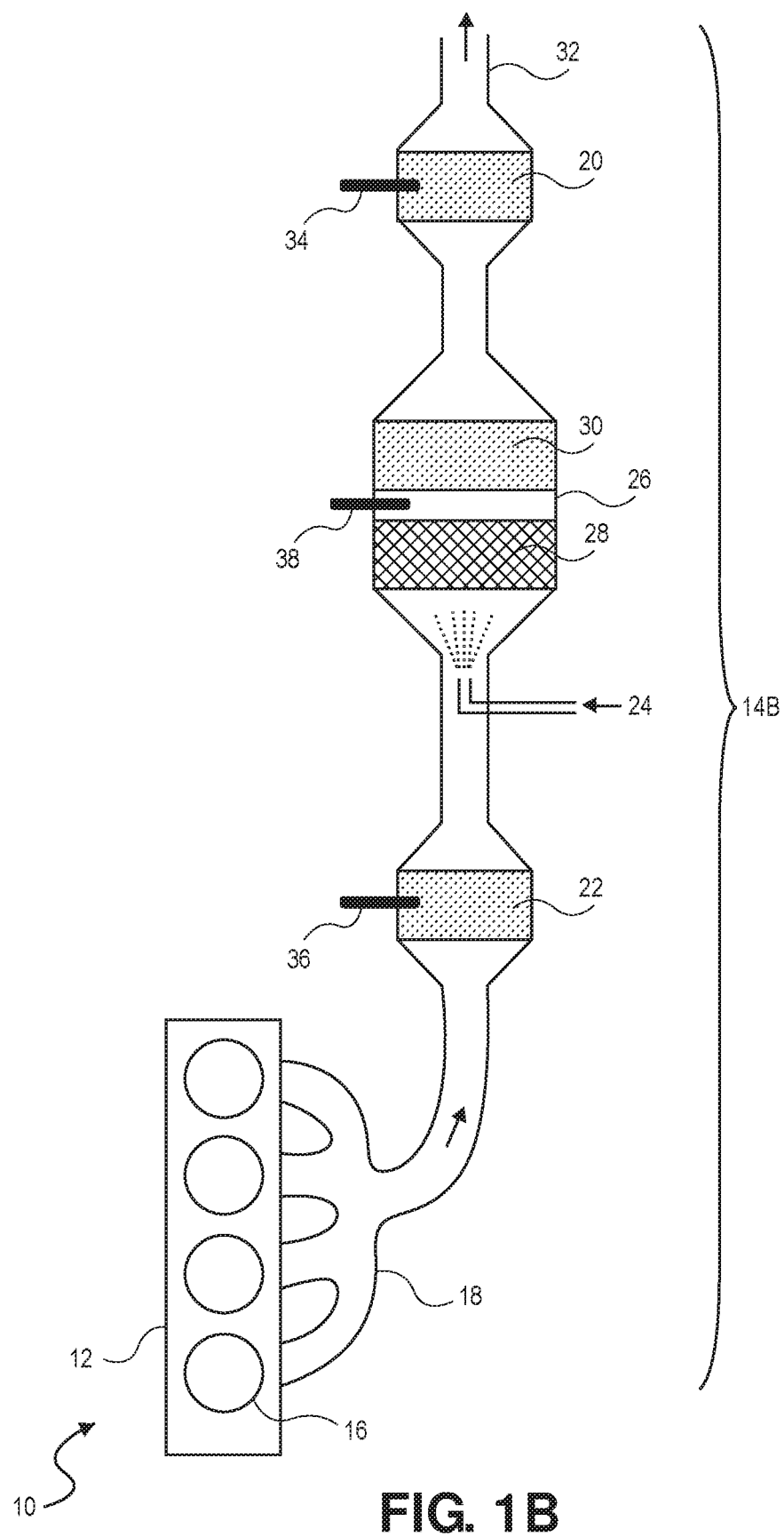
FIG. 1B is a schematic diagram of an alternative representative engine exhaust system for an exemplary internal combustion engine.

Referring to FIG. 1B, the system 10 including the lean burn engine 12 and an alternative representative exhaust system 14B is shown. With this arrangement, the particulate filter 20 is placed downstream of the reducing catalytic converter 26. Otherwise the exhaust systems 14A and 14B are essentially the same.

The arrangement of the exhaust system of 14B may be advantageous when the particulate filter 20 needs to be regularly cleaned by an active process that raises its temperature to burn out accumulated soot. Those temperatures commonly reach 500 C to 600 C. The active cleaning process may include intentionally introducing non-combusted hydrocarbons into the exhaust stream and oxidizing them in the oxidizing catalytic converter 22 to produce heat. By positioning the oxidizing catalytic converter 22 upstream from the particulate filter 20, the temperature within the particulate filter 20 may be actively controlled during the cleaning process.

It should be noted that the particular order of the various aftertreatment elements shown in FIG. 1A and FIG. 1B are merely exemplary and should not be construed as limiting. The order of the various aftertreatment elements described herein, as well as additional aftertreatment elements that may be used, may widely vary to meet operating conditions, regulatory requirements and/or other objectives.

It also should be noted that the exhaust systems 14A and 14B may also include other types of sensors besides temperature sensors. Such sensors may include (not illustrated), for example, oxygen sensors placed before and after the oxidizing catalytic converter 22, and a $NO_x$ sensor situated downstream from the reducing catalytic converter 26.

It should further be noted that various other features and elements not shown in FIGS. 1A and 1B may be situated between the engine and the aftertreatment elements of exhaust systems 14A and 14B. Such elements may include, but are not limited to, an exhaust gas recirculation system (EGR), a turbine to power a turbocharger, and a waste gate to control exhaust gas flow through the turbine, etc.

Exhaust System Operating Temperatures

The exhaust stream will generally be at its hottest temperature as it passes from the engine 12 through the exhaust manifold 18. As the exhaust stream passes through the subsequent elements of the exhaust system 14A/14B, the gases tend to cool from one stage to the next. The aftertreatment elements 20, 22 and 26 are therefore typically arranged in the order requiring the highest to lowest operating temperatures. For example, the exhaust gasses passing through the particulate filter 20 are hotter than that passing thru to the downstream elements 20 and 26 in FIG. 1A. In the arrangement of FIG. 1B the gasses passing through the reducing catalytic converter 26 are hotter than that of the downstream particulate filter 20. It should be appreciated that exothermic chemical reactions may occur in any aftertreatment element, which may raise the temperature of the aftertreatment element and any other downstream elements.

In order for the aftertreatment systems 14A and 14B to properly function, the elements 20, 22 and 26 each need to operate within a specified elevated temperature range. In a non-exclusive embodiment, the representative operating range for the reducing catalyst 26 is in the approximate range of 200° to 400° C. It should be understood that these temperature values are approximate and not absolute. Each may vary, for example, within ten percent (+/−10%) from 200° C. and 400° C. If the reducing catalytic converter 26 (including reducing catalytic converters 28, 30) is last in line for a given aftertreatment system, the upstream elements including the particulate filter 20 and the oxidizing catalyst 22, regardless of their order, will typically operate at somewhat higher temperature ranges.

Figure 2:
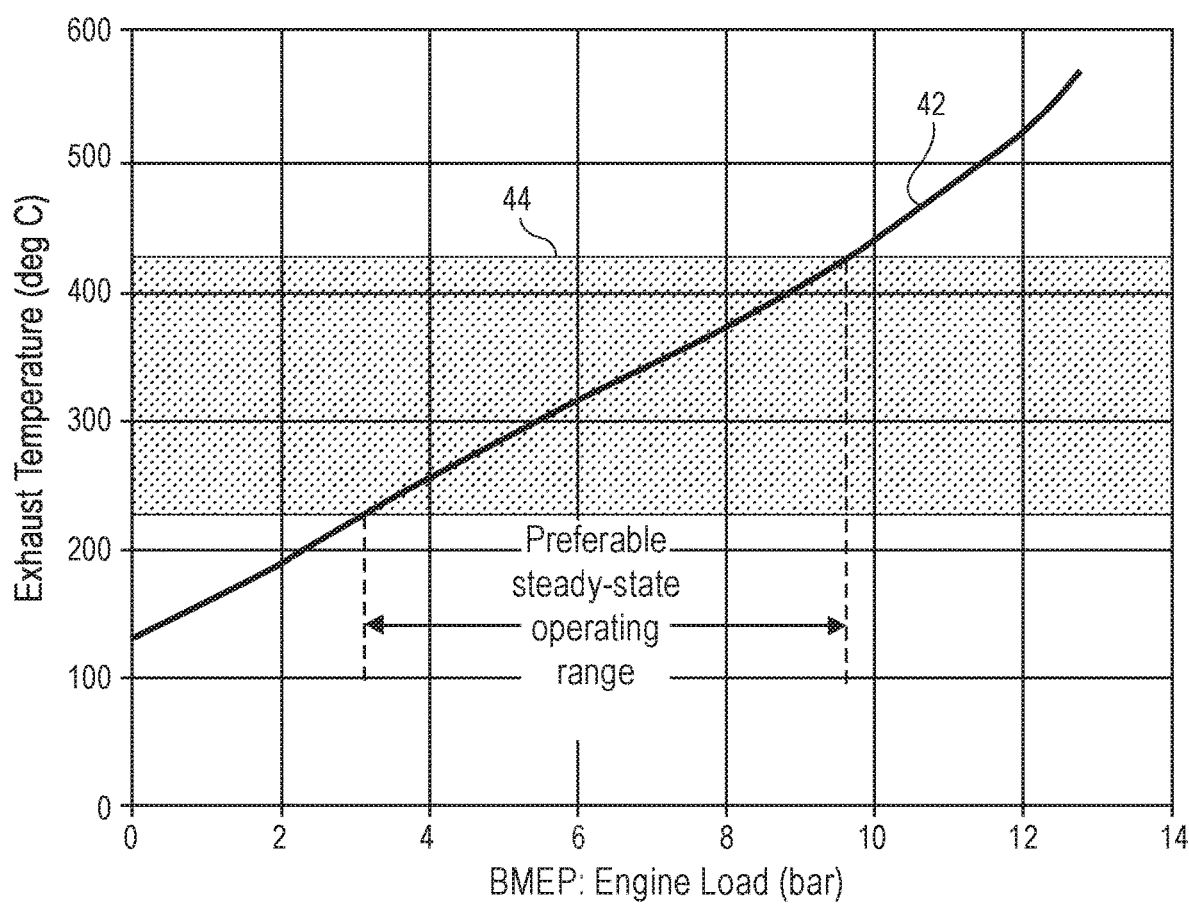
FIG. 2 is a plot of exhaust gas temperature versus engine load for an exemplary internal combustion engine.

Referring to FIG. 2, a plot 40 is illustrated depicting the relationship of the exhaust gas temperature at the exhaust manifold 18 versus the operating load for a representative boosted, compression-ignition, engine 12 operating at 1250 rpm without cylinder deactivation.

In this example, the curve 42 represents the exhaust gas temperature as a function of engine load expressed in Brake Mean Effective Pressure (BMEP) for the case where all engine cylinders are firing under substantially the same conditions.

The operating range 44 is the temperature range of the exhaust gases in the exhaust manifold 18 that result in effective operation of the aftertreatment system. In this particular example, the operating range is approximately 225° to 425° C.

As previously noted, the exhaust gases will typically cool somewhat at each stage of either aftertreatment system 14A/14B. For example, by the time the exhaust gases reach the reducing catalytic converters 28, 30 in aftertreatment system 14A, the temperature may have dropped approximately 25° C. In other words, the temperature of the exhaust gases is at or near the representative operating range of the reducing catalytic converter 26, which as noted above, may be 200° to 400° C.

It is important to note that the provided temperature ranges at the exhaust manifold 18 and at the last stage of the aftertreatment systems 14A/14B are merely exemplary and should not be construed as limiting in any regard. On the contrary, different engine operating points and engine designs may have different starting, intermediate, and ending temperatures and temperature offsets between the exhaust manifold 18 and the last element of the aftertreatment systems 14A/14B. In fact, in some cases, the exhaust gas temperatures may rise in the exhaust system due to exothermic chemical reactions. As such, the actual temperature values and ranges as provided herein should not be construed as limiting the scope of the present invention.

Inspection of FIG. 2 indicates that a sizable portion of the operating range of the engine 12 falls outside of the preferable steady-state operating range (i.e., outside an acceptable range for effective $NO_x$ removal). Advantageously, as described in more detail below, skip fire engine control may be effectively used as a strategy to modulate and maintain the exhaust gas temperatures within the preferable steady-state operating range.

Skip Fire Control System

Figure 3:
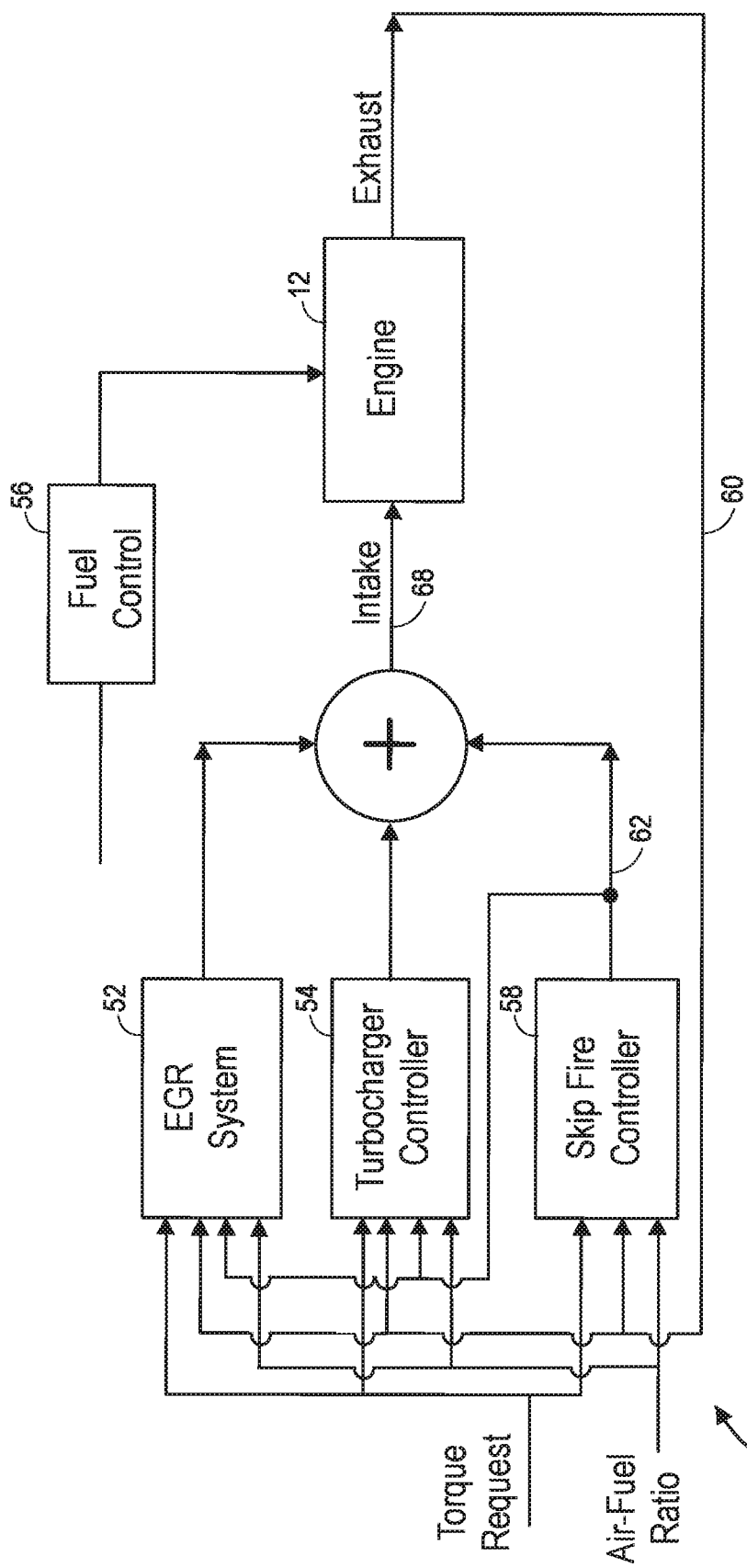
FIG. 3 is a schematic diagram of an engine controller for the exemplary internal combustion engine according to a non-exclusive embodiment of the present invention.

Referring to FIG. 3, a schematic diagram of an engine controller 50 illustrating a number of controls and/or systems for controlling operation of the engine 12 in a skip fire mode are illustrated. These control systems include an Exhaust Gas Recirculation (EGR) system controller 52, a turbocharger controller 54, a fuel control unit 56, and a skip fire controller 58.

The EGR system controller 52 operates to recirculate a portion of the exhaust gas back to the cylinders 16 of the engine 12. The recirculation tends to dilute the fresh air intake stream into the cylinder with gases inert to combustion. The exhaust gases act as absorbents of combustion generated heat and reduce peak temperatures within the cylinders 16. As a result, $NO_x$ emissions are typically reduced. In a compression-ignition Diesel engine for instance, the exhaust gas replaces some of the oxygen in the pre-combustion mixture. Since $NO_x$ forms primarily when a mixture of nitrogen and oxygen is subjected to high temperature, the lower combustion temperatures and reduction in the amount of oxygen in the working chamber cause a reduction in the amount of generated $NO_x$.

The boost controller 54 controls the amount of compressed air that is inducted into the cylinders 16 of the engine 12. Boosting, that is supplying compressed air to engine 12, allows generation of more power compared to a naturally aspirated engine since more air, and proportionally more fuel, can be input into the cylinders 16. The boost controller 54 may operate with either a turbocharger, a supercharger or a twin-charger. The key difference between a turbocharger and a supercharger is that a supercharger is mechanically driven by the engine, often through a belt connected to the crankshaft, whereas a turbocharger is powered by a turbine driven by the exhaust gas of the engine. Compared with a mechanically driven supercharger, turbochargers tend to be more efficient, but less responsive. A twin-charger refers to an engine with both a supercharger and a turbocharger.

The fuel control unit 56 is used to determine the amount of fuel required by the cylinders 16 of the engine 12. The amount of injected fuel is based primarily on the torque request, since the efficiency of torque generation is not strongly influenced by the air/fuel ratio for lean burn engine. There must however be adequate air flow into the engine to combust the delivered fuel and result in lean burn operation. Most vehicles rely on a mass airflow sensor to determine the amount of air. Given the air flow into the engine and injected fuel mass, the air-fuel ratio, which is one of the inputs into engine controller 50 may be determined. Based in part on this value, the fuel control unit 56 makes a determination of how much fuel to inject into the cylinders 16 of the engine 12. As previously noted, the air-fuel ratio for a Diesel Engine may range from approximately 16 to 55 compared to 14.6 for a stoichiometric air-fuel ratio.

The skip fire controller 58 is responsible for determining if the engine 12 should operate in either a full displacement mode or in the skip fire mode. When no firing fraction, other than one, is adequate to meet a high torque demand, then the skip fire controller will operate the engine 12 at full displacement. Otherwise, the engine is typically operated at one of multiple reduced effective displacements, each defined by a different firing density or fraction, in the skip fire mode.

When in the skip fire mode, the skip fire controller 58 is responsible for determining a firing density or firing fraction that meets a current torque request. In other words, the skip fire controller 58 defines a firing fraction that is suitable to (1) meet the current torque request and (2) operate the vehicle at acceptable levels of NVH. Satisfying these two constraints generally have the highest priority in the engine control architecture. Other parameters that may also be optimized are (3) fuel efficiency, (4) exhaust gas temperature, and (5) air; fuel ratio, Point (3) needs no explanation, since it is clearly advantageous to minimize fuel consumption. Points (4) and (5) stem from a desire to reduce the burden on aftertreatment elements in the exhaust system and to improve tailpipe emissions. As driving conditions change (i.e., the engine speed and torque demand change), the skip fire controller 58 is responsible for selecting different firing fractions, each indicative of different reduced effective displacements less than the full displacement of the engine 12, that best meets the five objects (1) through (5) articulated above.

The skip fire controller 58 receives at least three inputs, including (a) a current torque request, (b) a signal 60 indicative of the temperature of the exhaust gases in the aftertreatment system 14A/14B, and (c) an air-fuel ratio of one or more active cylinders 16 of the engine 12. In response, the skip fire controller 58 generates a firing density or fraction 62. With these three inputs, the skip fire controller 58 is able to provide ever finer control of the engine 12, selecting an optimum firing density that best meets objectives (1-5) mentioned above.

The turbocharger controller 54 receives the (a) current torque request, (b) signal 60 indicative of temperature of the exhaust gases in the aftertreatment system 14A/14B, (c) air-fuel ratio provided to one or more of the cylinders 16 of the engine 12, and (d) an output of the skip fire controller 58. In response, the boost controller 54 determines the amount of compressed air that is to be inducted into the cylinders 16 of the engine 12.

The EGR system controller 52 similarly receives the (a) current torque request, (b) signal 60 indicative of temperature of the exhaust gases in the aftertreatment system 14A/14B, (c) air-fuel ratio provided to one or more of the cylinders 16 of the engine 12, and (d) an output of the skip fire controller 58. In response, the EGR system controller 52 determines the amount or percentage of exhaust gases that are to be recirculated. Again, by receiving the three inputs (a), (b) and (c), the EGR system is able to make a more precise determination on the amount of exhaust gases to recirculate.

The outputs from the skip fire controller 58, the boost controller 54 and the EGR controller 52 are then all considered to generate an air intake value 68, which is provided to the cylinders 16 of the engine 12. In addition, as noted above, the fuel control unit 56 considers the air intake value 68 in providing an appropriate amount of fuel to the cylinders 16 of the engine 12. The fuel and the air, together, define an air-fuel mixture provided to the cylinders 16, characterized by an air-fuel ratio.

In a non-exclusive embodiment, the skip fire controller 58 is a dynamic skip fire controller. In other words, the skip fire controller 58 makes a decision to fire or not fire a given cylinder of an engine dynamically, meaning on a firing opportunity-by-firing opportunity basis.

Figure 4:
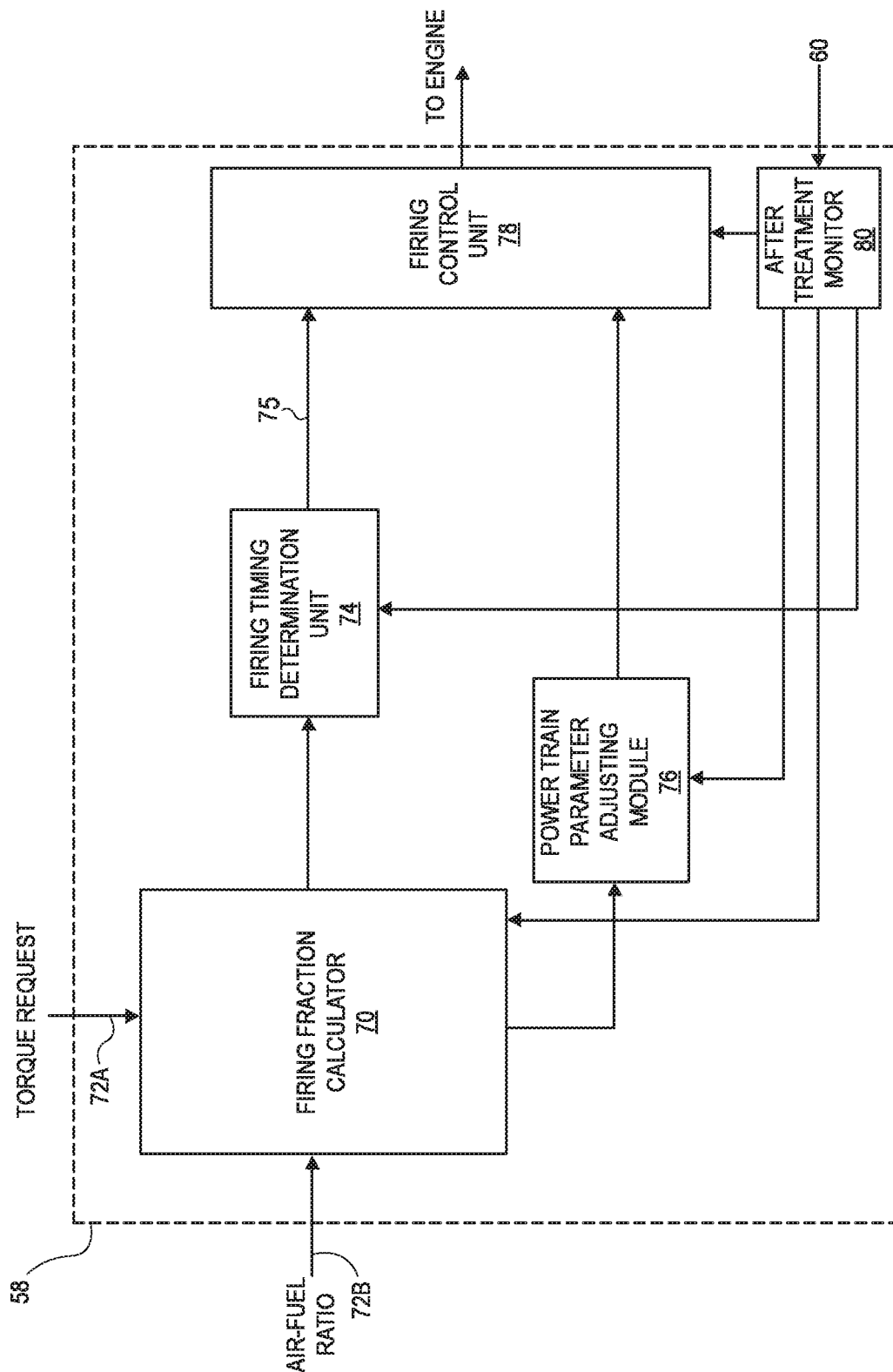
FIG. 4 is a logic diagram of a skip fire controller arrange to operate the exemplary internal combustion engine according to a non-exclusive embodiment of the present invention.

Referring to FIG. 4, a logic diagram of the skip fire controller 58 is illustrated.

The skip fire controller 58 includes a firing fraction calculator 70, a firing timing determination unit 74, a power train parameter adjusting module 76, a firing control unit 78 and an aftertreatment monitor 80.

The firing fraction calculator 70 may receive at least three inputs including (a) a current torque request 72A, (b) a temperature of the exhaust gases as provided by the aftertreatment monitor 80, which receives signal 60 and (c) a target air-fuel ratio 72B. In response, the firing fraction calculator 70 determines a skip fire firing fraction or firing density that best matches the objectives noted above. It should be appreciated that a firing fraction or density may be conveyed or represented in a wide variety of ways. For example, the firing fraction or firing density may take the form of a firing pattern, sequence or any other firing characteristic that involves or inherently conveys the aforementioned percentage or density of firings.

In yet other embodiments, the firing fraction calculator 70 may take into account other information in determining the firing density. Such other information may include, for example, vehicle speed, engine speed, transmission gear ratio, oxygen sensor data, $NO_x$ sensor data, ambient air temperature, exhaust gas temperature, catalyst temperature, barometric pressure, ambient humidity, engine coolant temperature, etc. In various embodiments, as these parameters change with the passage of time, the firing fraction may be dynamically adjusted in response to the changes.

The aftertreatment monitor 80 represents any suitable module, mechanism and/or sensor(s) that obtain data relating to a temperature of an aftertreatment element. If the reducing catalytic converter 26 has the narrowest operating range of any aftertreatment element, only data representative of its temperature may be used. Alternatively, the aftertreatment temperature may correspond to the temperature of any or all of the particulate filter 20, oxidizing catalytic converter 22 and/or reducing catalytic converter 26 (see FIGS. 1A and 1B). In various embodiments, for example, the aftertreatment monitor 80 may include or work in cooperation with oxygen sensor data from oxygen sensors in the aftertreatment system 14A/14B and $NO_x$ sensors placed before and after the reducing catalytic converter 26. Aftertreatment monitor 80 may also include such inputs as ambient air temperature, exhaust gas temperature in the exhaust manifold, barometric pressure, ambient humidity and/or engine coolant temperature.

In some embodiments, the skip fire controller 58 and the aftertreatment monitor 80 do not require a direct measurement or sensing of the temperature of an aftertreatment element. Instead, an algorithm using one or more inputs, such as a catalytic converter temperature model, may be used to estimate the aftertreatment element or system temperature. The model may be based on one or more of the above parameters (e.g., oxygen sensor data, $NO_x$ sensor data, exhaust gas temperature, ambient temperature, barometric pressure, ambient humidity, etc.) that are representative or related to a catalytic converter temperature.

The firing timing determination unit 74 receives input from the firing fraction calculator 70 and/or the power train parameter adjusting module 76 and is arranged to issue a sequence of firing commands (e.g., drive pulse signal) that are provided to the firing control unit 78. The firing timing determination unit 74 may take a wide variety of different forms. For example, in some embodiments, the firing timing determination unit 74 may utilize various types of lookup tables to implement the desired control algorithms. In other embodiments, a sigma delta converter or other mechanisms are used. The sequence of firing commands (sometimes referred to as a drive pulse signal 75) are provided to the firing control unit 78, which orchestrates the actual firings of the cylinders 16 of the engine 12.

The power train parameter adjusting module 76 directs the firing control unit 78 to set selected power train parameters appropriately to ensure that the actual engine output substantially equals the requested engine output at the commanded firing fraction or density. By way of example, the power train parameter adjusting module 76 may be responsible for determining the desired fueling level, number of fuel injection events, fuel injection timing, exhaust gas recirculation (EGR) level, and/or other engine settings that are desirable to help ensure that the actual engine output matches the requested engine output.

The firing control unit 78 receives input from the firing timing determination unit 72 and the power train parameter adjusting module 76. Based on the aforementioned inputs, the firing control unit 78 directs the engine to operate in the firing sequence 75 determined by the firing timing determination unit 74 with the engine parameters determined by the power train parameter adjusting module 76.

By way of example, some suitable firing fraction calculators, firing timing determination units, power train parameter adjusting modules and other associated modules are described in co-assigned U.S. Pat. Nos. 7,954,474; 7,886,715; 7,849,835; 7,577,511; 8,099,224; 8,131,445; 8,131,447; 9,086,020; and 9,120,478: U.S. patent application Ser. Nos. 13/774,134; 13/963,686; 13/953,615; 13/886,107; 13/963,759; 13/963,819; 13/961,701; 13/843,567; 13/794,157; 13/842,234; 13/004,839, 13/654,244 and 13/004,844, each of which is incorporated herein by reference in its entirety for all purposes.

Compression Ignition Engine Air-Fuel Ratio Range

Compression-ignition engines can operate over a wide range of air-fuel ratios. For example, a Diesel engine can operate with air-fuel ratio ranging from 16 to 55 depending on speed/load conditions. As previously noted, the torque of a Diesel engine is determined by the amount of fuel injected, not the inducted air mass since an excess of oxygen exists to combust all the fuel. However, the inducted air mass ingested affects air-fuel ratio, which in turn, affects exhaust gas temperature and engine-out emissions.

Figure 5:
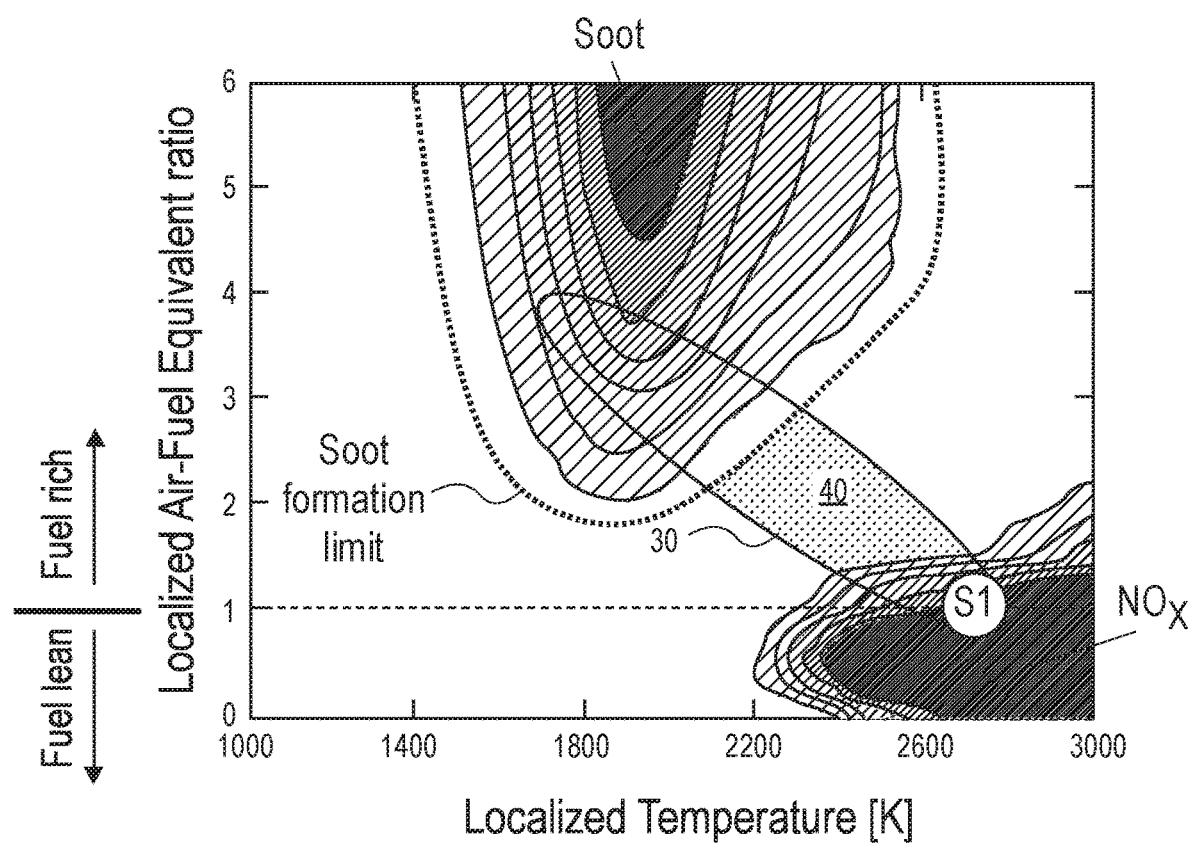
FIG. 5 is a plot depicting the relationship between the localized fuel-air equivalence ratio and localized combustion temperature for a representative compression-ignition engine.

Referring to FIG. 5, a plot depicting the relationship between the localized fuel/air equivalence ratio and combustion temperature for a representative Diesel engine is illustrated. As depicted, localized fuel-air equivalence ratios are provided along the vertical axis, while the temperature in degrees Kelvin or "K" of localized temperature during combustion is provided along the horizontal axis. The fuel-air equivalence ratio is defined as the ratio of the fuel-to-oxidizer ratio to the stoichiometric fuel-to-oxidizer ratio.

The air-fuel ratios provided along the vertical axis are considered "localized" because Diesel engines are typically stratified, meaning the air-fuel mixture is not homogeneous within the cylinder. As a result, the concentration of the fuel is higher in some regions (e.g., typically near the top of the cylinder where the fuel is injected) compared to other regions (e.g., near the bottom, away from the injected fuel jet) of the cylinder. Fuel is injected in multiple jets which disperse into fine drops and combustion primarily occurs in the vicinity of the fuel injection jets.

Diesel engine operation generally occurs within the region defined by an oval 30. Operation in the upper left side of the oval 30 corresponds to operation with an average air/fuel ratio near stoichiometry. Operation in the lower right side of the oval 30 correspondence to operation at high average air/fuel ratios. Note that the average air/fuel ratio is not simply the inverse of the fuel-air equivalence ratio multiplied by the stoichiometric air/fuel ratio (14.6) because of the inhomogeneous nature of Diesel engine combustion.

The dashed horizontal line represents stoichiometry, or a fuel-air equivalence ratio of 1 (corresponding to an air/fuel ratio of approximately 14.6 as previously described). Above stoichiometry, the fuel-air ratio is rich. Below stoichiometry, the fuel-air ratio is lean. For reference, the typical operating region of spark ignition (SI) engines is also denoted in the figure. The SI engine operates in the $NO_x$ generation region, meaning some type of $NO_x$ reducing aftertreatment element, such as a three-way catalyst, is typically needed.

The plot further shows a soot region define by "soot formation limit" line. Operating regions within the soot formation limit line generate detectable quantities of soot, with more soot produced as the shading becomes darker. When operating within the soot region, a particulate filter is typically needed to reduce soot in the exhaust stream prior to releasing the exhaust stream into the atmosphere. To minimize the cleaning burden on the particulate filter, operation within the more darkly shaded areas should be avoided or at least minimized.

The plot further shows a $NO_x$ emission region. Again, areas of darker shading represent higher concentrations of undesirable pollutants in the exhaust stream, in this case $NO_x$. A reducing catalytic converter is typically needed to reduce $NO_x$ emissions. As with soot, it is desirable to operate away from the regions of highest $NO_x$ emissions to reduce the burden on the $NO_x$ aftertreatment system. From an emission viewpoint, operation in the dotted area 40 is desired, since both soot and $NO_x$ emissions are intrinsically low without any aftertreatment. An air-fuel ratio between 20 and 35 may be desired so that most combustion can occur in the operating region 40. Operation within region 40 may be maintained by adjust the firing density, boost level, exhaust gas recirculation level, and the lift profile of the intake and exhaust valves. In some embodiments, an engine may be controlled in such a manner to meet environmental regulations without use of any aftertreatment system. Alternatively, the aftertreatment system may be reduced in size and perhaps complexity, since the pollutant load the aftertreatment system needs to remove is reduced.

The plot of FIG. 5 thus demonstrates, particularly for compression-ignition engines, the value of controlling the air-fuel ratio as part of a skip fire control algorithm. With addition of air-fuel ratio and exhaust temperature as inputs to skip fire controller 58, an appropriate firing density can be selected for a desired torque output, air-fuel ratio and exhaust gas temperature. The selected firing density may or may not be optimal for fuel consumption. However, in certain circumstances, achieving low tailpipe emissions to meet regulatory requirements is more important than the absolute highest fuel efficiency.

In order to accurately control the air-fuel ratio in a firing cylinder, the inducted mass air charge (MAC) must be accurately estimated. As disclosed in U.S. Pat. No. 9,945,313 and U.S. patent application Ser. No. 15/628,309, both of which are incorporated by reference herein in their entirety for all purposes, determination of inducted air mass is more complex in skip fire controlled engines than in engines operating at a fixed displacement. Adjustments to the cylinder MAC may be made based on a firing history of the cylinder and on an engine skip-fire sequence preceding firing of the cylinder.

As described above, controlling the air-fuel ratio in a firing cylinder is an important element in skip fire control of a lean burn engine. Additionally, control of fuel injection timing and fuel injection pattern is also important. Even though the air-fuel ratio is the same in different working cycles, the generated torque and combustion byproducts may differ depending on the timing and pattern of the fuel injection. Fuel injection timing refers to when fuel is injected in a cylinder relative to position of a piston in the cylinder, typically denoted by crankshaft angle. Fuel injection pattern refers to the number and duration of discrete fuel injection events that may occur during a working cycle. For example, rather than all fuel being injected in a single event, the fuel injection may be discontinuous with multiple injection events in a working cycle that in total deliver the desired fuel mass.

A cylinder that was skipped on one or more prior working cycles will have cooler cylinder walls than if it had been fired. The greatest impact on cylinder wall temperature is from the immediately prior working cycle, but the cylinder firing history for approximately the past five firing opportunities will influence cylinder wall temperature. Additionally, the composition of residual gases in the cylinder may be different if the preceding firing opportunity was a skip rather than a fire. These changes in the initial conditions at the onset of combustion can impact combustion dynamics. To adjust for the different initial combustion conditions, the timing and pattern of fuel injection may be optimized based on the firing history of the cylinder. The desired air-fuel ratio may also be optimized. Adjusting fuel injection timing, fuel injection pattern, and air-fuel ratio may reduce undesirable combustion products and increase fuel efficiency in the fired cylinder.

In addition, during transition from one steady state to another steady state condition (i.e., a transition from one firing density to another), the use of the three inputs as described herein provides flexibility and control to optimize air-fuel ratio and/or exhaust gas temperature in such a way as to minimize spikes in engine-out emissions during firing density transitions, which was previously not possible.

Reducing Emissions During Firing Density Transitions

Figure 6A:
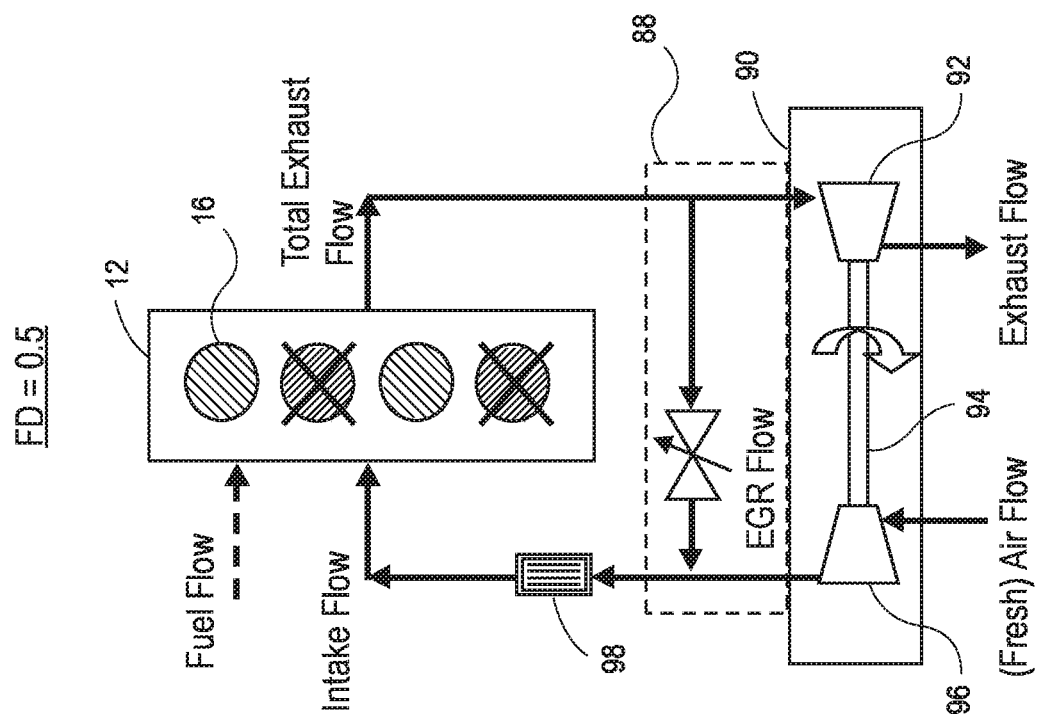
Figure 6A:
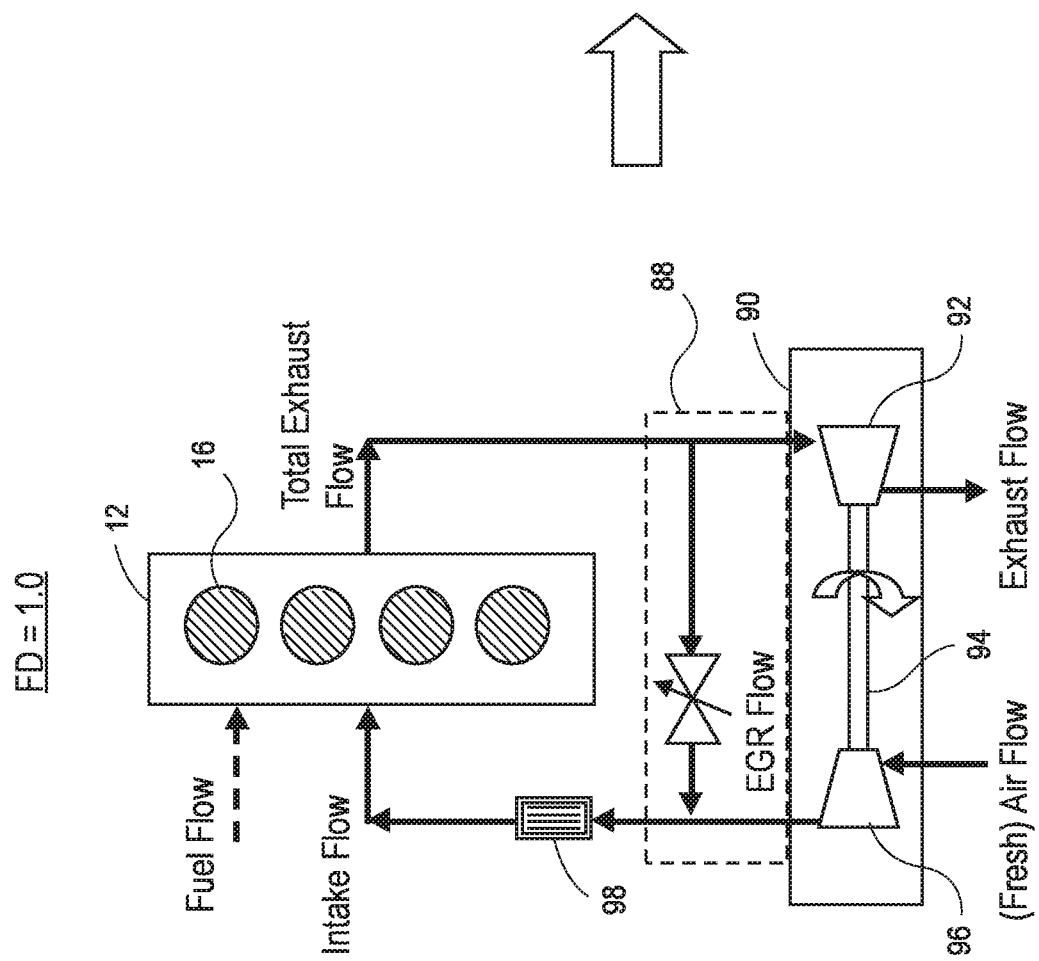

FIG. 6A illustrates a representative engine 12 including four cylinders 16. The engine 12 is arranged to receive fuel from the fuel control unit 56 (see FIG. 3) and intake gas flow from a combination of an EGR system 88 controlled by the EGR system controller 52 (see FIG. 3) and a turbocharger system 90 controlled by the boost controller 54 (see FIG. 3). The EGR system 88 includes an EGR flow valve that controls flow of exhaust gases back into the intake gas flow of the engine 12. The turbocharger system 90 includes an exhaust turbine 92, a shaft 94, and a compressor wheel 96. The compressor wheel 96 is part of a compressor that serves to increase pressure in an intake manifold above atmospheric pressure. An optional cooler 98 may also be provided to cool the intake air allowing a higher MAC. Air from the intake manifold is inducted into a cylinder thru one or more intake valve(s) on each cylinder.

FIG. 6A depicts an example of a firing density (FD) transition from 1.0 to 0.5. Prior to the transition, all four cylinders are fired as illustrated on the left side of the figure. After the transition, only two of the four cylinders are fired, while the remaining two cylinders are skipped, as graphically illustrated by the "X" through two of the four cylinders 16 on the right side of the figure.

FIGS. 6B-6C are diagrams which depict behavior of various engine parameters thru a firing density transition, such as the transition from a firing density of 1 to a firing density of 0.5 depicted in FIG. 6A. FIG. 6B depicts the engine parameter behavior during an abrupt firing density transition and FIG. 6C depicts the engine parameter behavior during a gradual or smoothed firing density transition.

An abrupt transition may refer to the case where the engine makes the firing density transition in one engine cycle or 4 firing opportunities for a 4-cylinder engine, which takes two engine revolutions for a 4-stroke engine. For an engine operating at 1500 rpm, a typical engine speed, the abrupt transition occurs over a period of 80 milliseconds. As shown in FIG. 6B, when the firing density transitions directly from 1.0 to 0.5, the fuel flow per operating cylinder immediately steps up so that the torque demand (assumed constant over the transition) can now be met by 2 cylinders instead of 4 cylinders. The air flow per cylinder, however, can only adjust gradually due to inherent lag in the turbocharger system 90 adjusting the intake manifold pressure for the new firing density. As a result, the air-fuel ratio drops considerably during the transition, causing a temporary spike in particulate emissions (PM) during the transition.

By contrast, FIG. 6C shows how the PM spike may be significantly reduced by managing the transition from a high firing density to a lower firing density. The management of the transition involves firing at one or more intermediate firing densities between the higher firing density and the lower firing density. Equivalently, the transition between the initial and final target firing density may be viewed as occurring over multiple engine cycles. For instance, if the initial firing density is 1.0 and the target firing density is 0.5, then one or more intermediate firing densities of (0.9, 0.8, 0.7 and 0.6) may be used to smooth the transition. By using one or more intermediate firing densities, the air-fuel ratio in the fired cylinders 16 remains relatively stable, and as a result, the PM spike is minimized. The transition from the initial to the target firing faction may occur over approximately 3 to 15 engine cycles depending on the exact nature of the transition.

Figure 7A:
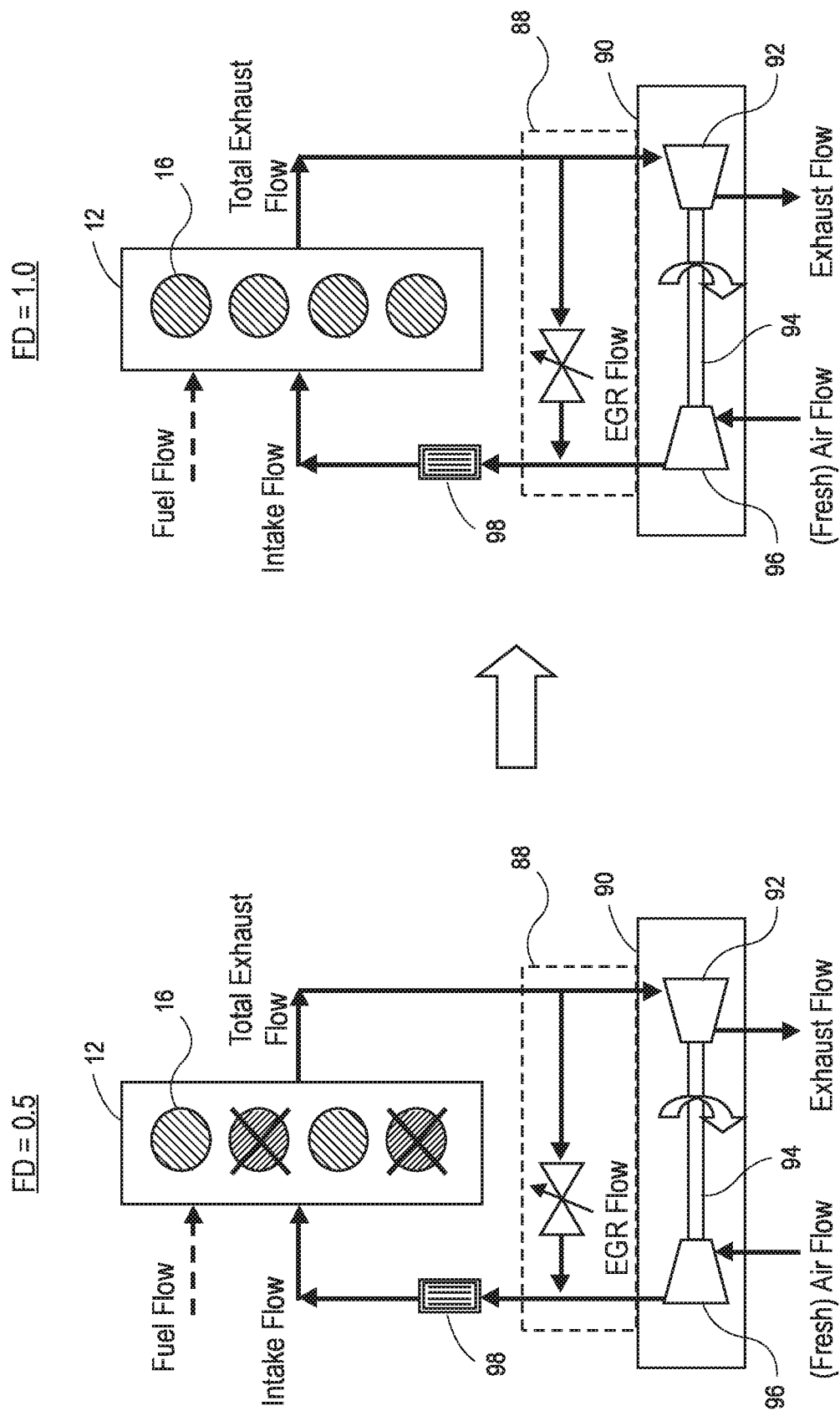

FIG. 7A-7C are various diagrams illustrating how a spike in $NO_x$ emissions by the exemplary internal combustion engine is mitigated during transitions from a low firing density to a high firing density. The mitigation of a spike in the $NO_x$ emissions is essentially the complement of that described above. When the engine 12 is operating at a relatively low firing density and transitions to a higher firing density (e.g., a transition from 0.5 to 1.0), a gradual transition using one or more intermediate firing densities (e.g., 0.6, 0.7, 0.8, 0.9) tends to reduce the spike in $NO_x$ emissions.

FIG. 7A is similar to FIG. 6A except that the engine 12 is initially at a low firing density of 0.5 and transitions to a high firing density of 1. FIG. 7B shows behavior of various engine parameters during an abrupt transition from the low to the high firing density. The transition causes the fuel flow to each fired cylinder to immediately transition down. The air intake, however, gradually transitions lower due to lag. As a result, the air-fuel ratio in the fired chambers spikes, causing a corresponding spike in the $NO_x$ emissions. In contrast as shown in FIG. 7C, a controlled, gradual, transition reduces or eliminates altogether the spike in the air-fuel ratio and the resulting spike in the $NO_x$ emissions.

Controlling Firing Density to Modulate Exhaust Temperature

The skip fire controller 58 can be used to modulate the temperature of the exhaust gas in several ways. First, by either skipping or firing cylinders 16, the temperature can be controlled. Second, with skipped cylinders, either pumping air thru the cylinder or deactivating the cylinder by closing one or both of the intake or exhaust valve(s) so that no air is pumped thru the cylinder.

Different firing densities change the work load of the individual cylinders 16 of the engine 12. If many or all are fired, each cylinder 16 performs less work. If fewer are fired, each cylinder 16 performs more work. In general, the more work a given cylinder 16 performs, the higher the temperature of the exhaust gas from that cylinder.

As noted above with regard to the FIG. 2, the representative operating range for the reducing catalytic converter 26 may be in the approximate range of 200° to 400° C. By changing the firing density, it is therefore possible to modulate the temperature of the exhaust gases to substantially stay within the range of 200° to 400° C. range. By keeping within the ideal temperature range, the reducing catalytic converter 26 is more effective in reducing $NO_x$ emissions.

Consider an example of a six-cylinder engine with three active cylinders and three that are deactivated or skipped. Each active cylinder will receive an air-fuel ratio that is relatively rich. By activating a forth (or more) cylinder(s), the same amount of fuel is spread out among the four (or more) cylinders. As a result, the air-fuel ratio per cylinder becomes leaner. The leaner the air-fuel ratio, the cooler the resulting exhaust will be. Thus, by activating more cylinders, the temperature of the exhaust gases can be controlled and reduced. The complement of the above can also be used to increase the temperature of the exhaust gases if too cool. If five or six cylinders are operational and the exhaust is too cool, then one or several cylinders can be deactivated. By deactivating cylinders, the air-fuel ratio spread across the remaining active cylinders becomes richer. As a result, combustion yields hotter exhaust gases.

The skipping of a cylinder 16 can be implemented in one of two ways. First, either the intake or exhaust valves (or both) can be closed during a skipped firing opportunity. As a result, no air is pumped through the cylinder. Second, both the intake and the exhaust valves can be opened, but no fuel is provided to the cylinder during a skipped firing opportunity. As a result, air is pumped through the chamber, but there is no combustion. When air is pumped into the exhaust system, the effect is to reduce the temperature of the exhaust gases. Thus, by either allowing skipped cylinders to either pump or not pump air, the temperature of the exhaust gases can be further controlled or modulated.

Figure 8:
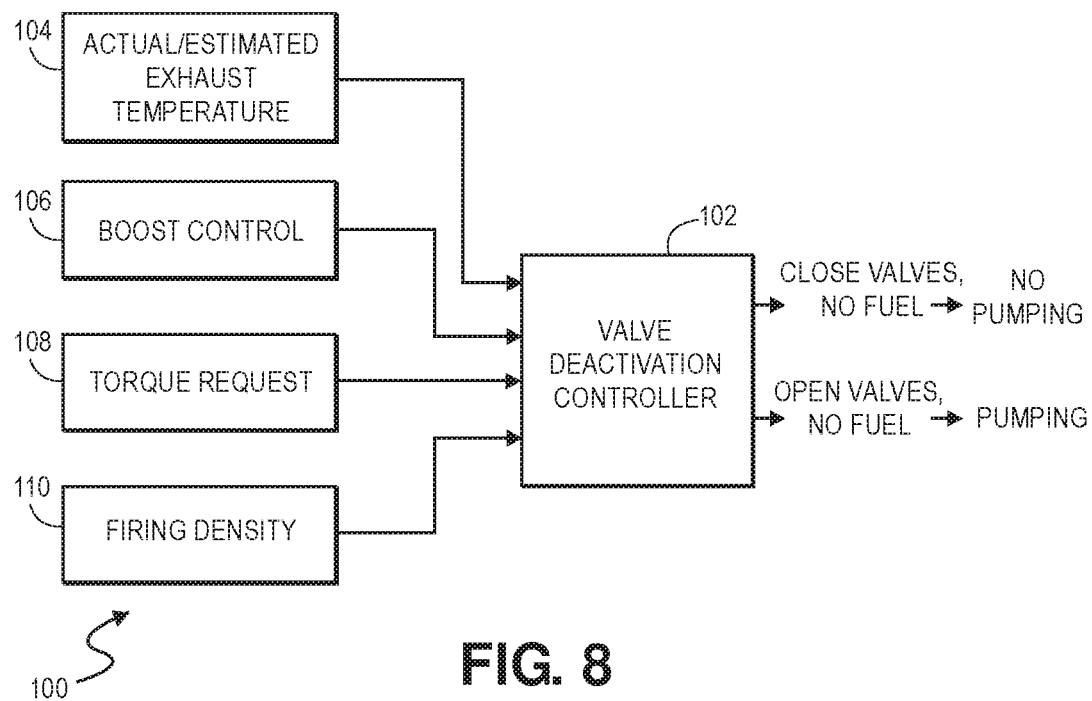
FIG. 8 is a schematic block diagram for a valve deactivation controller according to a non-exclusive embodiment of the present invention.

Referring to FIG. 8, a schematic block diagram for a valve deactivation controller 102 is shown. In various embodiments, the valve activation controller 102 may be included in or separate from the skip fire controller 58.

The valve deactivation controller 102 receives an input 104 indicative of the actual and/or an estimate of the exhaust temperature in the aftertreatment system 14A/14B, an input 106 indicative of the amount of compressed air that is forced into the cylinders 16 by the turbocharger 90 (or some other type of boost system), the current torque request 108, and an input 110 indicative of the firing density as determined by the skip fire controller 58. In response, the valve deactivation controller 102 makes a decision for the skipped cylinders 16 to either:

(1) Prevent pumping by closing either the intake and/or exhaust valves of the skipped cylinder 16; or (2) Allowing air to be pumped through the deactivated cylinder 16 by opening both the intake and exhaust valves. Since no fuel is provided to the cylinder 16, no combustion occurs, and intake air is pumped into the aftertreatment system 14A/14B.

Figure 9:
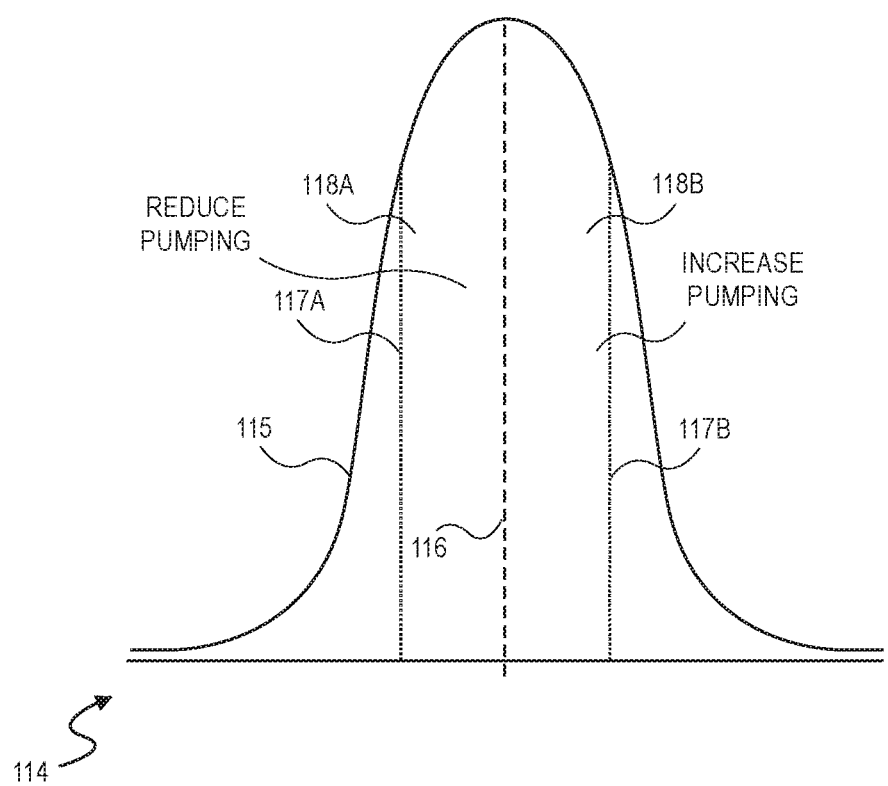
FIG. 9 is a diagram illustrating modulation of exhaust gas temperature by using cylinder deactivation during skip fire operation of the exemplary internal combustion engine according to a non-exclusive embodiment of the present invention.

FIG. 9 is a diagram 114 illustrating how the valve deactivation controller 102 may be used to modulate exhaust temperatures. Curve 115 represents efficiency of the reducing catalyst as a function of the reducing catalyst temperature. As noted, a representative operating range for the reducing catalyst 26 may be in the range of 200° to 400° C., which is defined by the region between dotted lines 117A and 117B. The line 116 represents a threshold temperature value below the maximum operating range of 400° C. The precise temperature value of the threshold 116 may vary, but in general, it represents a preferred or target operating temperature of the reducing catalytic converter 26. The threshold value may be offset towards the upper bound of the operating temperature range as shown in FIG. 9, since pumping air through the engine will rapidly reduce the catalyst temperature, whereas not pumping air has a more gradual impact on catalyst temperature. When the actual exhaust temperature 104 is in the region 118A (i.e., below the threshold 116), then the valve deactivation controller 102 operates to prevent pumping of skipped cylinders 16. As a result, the temperature in the aftertreatment system 14A/14B will be essentially maintained or prevented from decreasing. If the actual exhaust temperature 104 is in the region 118B (i.e., above the threshold 116), then the valve deactivation controller 102 operates to allow pumping of skipped cylinders 16. As a result, the temperature in the aftertreatment system 14A/14B will tend to decrease.

The ability to control or modulate the temperature of the exhaust gas can therefore be implemented by (1) firing or skipping cylinders and/or (2) by either allowing or preventing pumping on skipped cylinders. In alternative embodiments, just the cylinder firing/skipping can be used, or alternatively, both techniques can be cooperatively used.

Priorities

Most turbochargers rely on a contour efficiency map that specifies a high efficiency region defined by (a) a particular pressure range and (b) an air volume range. The contour efficiency map also defines a surge line that should not be exceeded. If the pressure exceeds the surge line, the chance of mechanical damage to the turbocharger and/or the engine increases significantly.

Cylinder deactivation tends to increase the MAC and pressure in the firing cylinders. With one or more deactivated cylinders, the intake air is shared among fewer active cylinders, causing an increase of pressure than if all the cylinders are active. As a result, cylinder deactivation may increase the chance that the surge line of the turbocharger is exceeded. A priority scheme that balances priority between the torque requests, exhaust temperature, and preventing a turbocharger from exceeding its surge line is therefore desirable.

Figure 10:
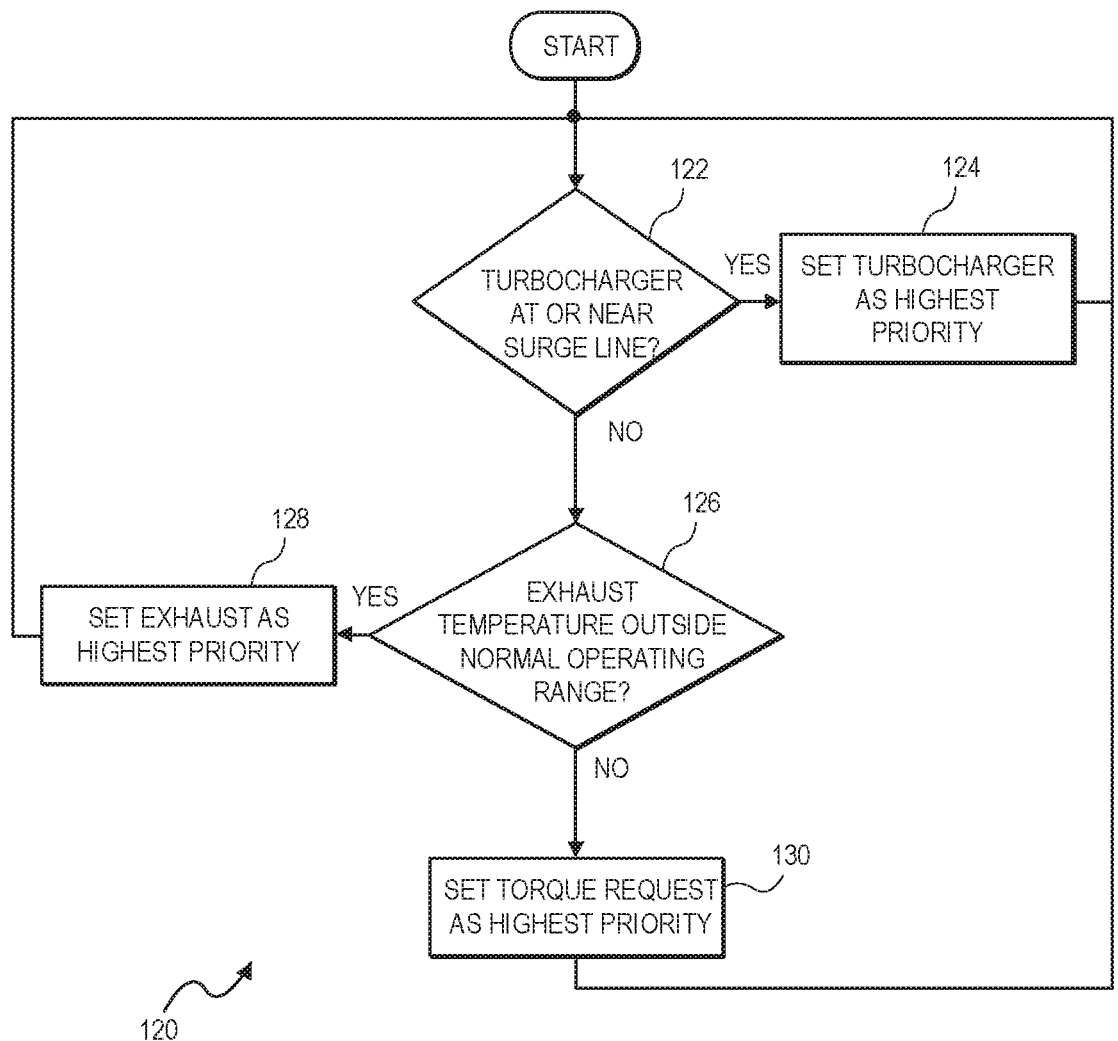
FIG. 10 is a logic flow diagram illustrating prioritization of inputs provided to the valve deactivation controller according to a non-exclusive embodiment of the present invention.

Referring to FIG. 10 a logic flow diagram 120 illustrating a prioritization scheme implemented by the skip fire controller 58 and/or the valve deactivation controller 102 is shown. The intent of the prioritization scheme is to continually monitor the exhaust temperature, the turbocharger operating conditions, and the current torque request and to set priorities on which should take precedent based on real-time operating conditions. Since the likelihood of turbocharger and/or engine damage increases dramatically if the surge line is exceeded, the turbocharger is preferably set as the highest priority. Second in priority is the exhaust gas temperature, which can damage the exhaust system if it exceeds an operational limit for an extended period of time or lead to unacceptable emissions if it is outside of its normal operating region. Third in priority is the desire to meet the requested engine torque.

The logic flow diagram starts and proceeds to decision step 122. In decision step 122 the turbocharger is continually monitored. If the turbocharger compressor is operating at or near the surge line, then the turbocharger is given the highest priority and the flow diagram proceeds to step 124.

In step 124, the skip fire controller 58 and/or the valve deactivation controller 102 operate so as to move the turbocharger operating point away from the surge line, so there is sufficient operating margin to avoid surge. Such action may include activating more cylinders, reducing the air intake, reducing the pressure generated by the turbocharger, reducing the EGR flow, reducing engine torque, etc.

On the other hand, if turbocharger is operating well away from the surge line, then the flow diagram proceeds to decision step 126. In decision step 126 it is determined if exhaust gases are operating outside of a predefined normal range (e.g., 200° to 400° C.).

If yes, then the exhaust temperature is set as the highest priority (step 128). The skip fire controller 58 and/or the valve deactivation controller 102 operate to adjust the exhaust temperature to within its normal range by activating or deactivating cylinders and/or reducing the engine torque.

If the exhaust gas temperature is within its normal operating range, then the current torque request is set as the priority (step 130). As a result, the firing density defined by the skip fire controller 58 is defined predominately to meet the current torque request. The air-fuel ratio can be controlled so that the engine generally operates in region 40 of FIG. 5, where engine generated pollutants are minimized.

During operation, the above decisions are continually made. As a result, the priority of the skip fire controller 58 and/or the valve deactivation controller 102 are continually updated to meet current operating conditions. As issues with the turbocharger and/or aftertreatment system occur, they are prioritized and corrected. When no issues are present, then meeting the current torque demand is the priority.

Issues with Firing Density Transitions

During operation, the skip fire controller 58 is often required to transition from a first firing fraction to a target firing fraction to meet changing torque demands. During such transitions, the skip fire controller 58 has a number of constraints, including meeting the requested torque, preventing excessive NVH, controlling air flow through the internal combustion engine 12, operating with minimal pollutant emissions, and maintaining a proper air-fuel ratio. In some cases, these constraints conflict and satisfying one constraint may result in another constraint exceeding some pre-established limit. For example, if too much air is pumped through the internal combustion engine 12, then the exhaust gas temperature tends to decrease, which may degrade the efficiency of the exhaust aftertreatment system, resulting in increased output emissions. On the other hand if too little air is pumped, excessive emissions may be generated as the percentage of recirculated exhaust gas versus fresh air in the intake manifold becomes too high, resulting in an overly fuel-rich mixture that results in soot when combusted.

When the firing fraction calculator 70 transitions between different firing densities, the firing density and the associated fuel flow can change relatively quickly. The per cylinder air flow, however, can adjust only gradually due to inherent lag in the turbocharger system 90 in adjusting the intake manifold pressure to a new equilibrium level for the new firing density. Also, the ratio of recirculated exhaust gas to fresh air in the intake manifold can only gradually change due to the time required to adjust an EGR valve setting and the transit time of exhaust gas flow through the system.

During an abrupt transition from a high firing density to a lower target firing density, one or more cylinders that were firing are skipped. This requires more fuel in each firing cylinder to maintain a constant torque level. Since the ratio of fresh air to recirculated exhaust gas in the intake manifold and intake manifold pressure cannot instantaneously change, the air-fuel ratio would drop, becoming richer. With a fuel-rich mixture, less torque may result because of incomplete combustion, and excess soot may be generated due to insufficient fresh air to completely combust all the injected fuel.

Controlling the EGR system 52 to reduce the amount of recirculated exhaust gas in the intake manifold is one possible approach to maintaining a more constant air-fuel ratio. By modulating the mass of the exhaust gas circulated back into the intake manifold, the EGR system 52 can be used to achieve a desired ratio of fresh air to exhaust gas. The problem is that the adjustment does not occur instantaneously. On the contrary, typically multiple cylinder firing opportunities are needed for the desired ratio to be reached. During interim firing opportunities, less torque may be generated than needed and emissions may contain excessive amounts of soot. Clearly these are undesirable outcomes, so a different control strategy is required.

Another possible approach is to transition from the first high firing density to the target lower firing density more slowly. With a slower transition in the firing density, there may be adequate time to clear the intake manifold of excess exhaust gas and allow EGR system 52 to adjust the recirculated exhaust gas in the intake manifold to the desired ratio. However, the relatively slow transition of the firing density may induce unacceptable levels of NVH. That is the vibration dose value associated with the firing density transition may be unacceptable.

Similarly, an abrupt change in the firing density from a low first firing density to a target high firing density will cause previously skipped cylinders to fire. To maintain a constant torque, the fuel mass in each fired cylinder must drop. Now the air-fuel has increased, becoming leaner, which may be undesirable. Depending on the initial air-fuel ratio more $NO_x$ may be generated during combustion or the combustion may become unstable. Also, as more air passes through the engine 12, the temperature of the exhaust gases tends to decrease, which may degrade the efficiency of the exhaust aftertreatment system (e.g., 14A or 14B), which in turn, increases unwanted emissions.

With spark-ignition engines, the above-articulated issues can be managed by a combination of using a short firing density transition time, deactivating all skipped firing opportunities, and reducing torque output of a fired cylinder by retarding the spark. As a result, no uncombusted air is pumped into the exhaust system and the aftertreatment is not degraded by excess oxygen in the exhaust stream. Spark control (e.g., late ignition) may be used to retard combustion timing, reducing the torque output of a firing and mitigating an undesirable torque surge. A relatively smooth transition with acceptable NVH is thus achieved as described in U.S. Pat. No. 9,745,905, which is incorporated herein for all purposes.

With compression-ignition engines, there is no spark ignition and the initiation of combustion is less controlled. However, a compression-ignition engine is not constrained to operate with a stoichiometric air-fuel ratio as is often the case with spark-ignition engines. Hence, a torque surge or dip in a firing density transition may be controlled by simply injecting more or less fuel into firing cylinders during the transition. As described above, this can result in generation of excess soot or $NO_x$ in the exhaust gas. Also, in stratified combustion, compression-ignition engines (i.e. Diesel engines) the noise generated by combustion, output torque, and exhaust temperature can be controlled via the fuel injection pattern. For example, a Diesel engine may use an injection pattern consisting of a pilot injection, a main injection, and multiple post injections. The pilot injection helps to reduce combustion noise. The main injection generates the most of the torque associated with the cylinder firing. The one or more post injections typically generate little torque but may be used to increase the temperature of the exhaust gas. Thus, the fuel injection pattern can change during a firing density transition to help manage exhaust gas temperature, engine noise, output torque, and exhaust temperature. As a consequence of the differences between spark-ignition and compression-ignition engines, the approach used for firing density transitions in spark-ignition engines may not be optimal for compression-ignition engines. Instead, with existing compression-ignition engines, managing transitions typically involves managing tradeoffs between acceptable NVH levels versus emission levels or vice-versa.

Managing Firing Density Transitions

The Applicant has discovered that by separately setting the firing density and the pumping density of cylinders during transitions, excessive amounts of both emissions and NVH can be avoided. Generally, while operating at a steady-state firing density the firing density equals the pumping density, which implies that no cylinders pump air through the engine without firing. With the present invention, the skip fire controller 58 manages firing density transitions by separately defining (a) a firing density and (b) a pumping density. The pumping density should equal or exceed the firing density, since each cylinder firing will result in a pumping event as well as a firing event. With the defined firing density, NVH can be reduced while the torque request is met. With the defined pumping density, the rate of fresh air and/or recirculated exhaust gas pumped through the internal combustion engine is adjusted, allowing better control of the ratio of fresh air to exhaust gas in the intake manifold. This can reduce emissions and improve fuel efficiency. Thus, by intermixing or interspersing the firing of cylinders with the pumping of un-fueled cylinders, the conflicting demands of meeting the torque demand, preventing excessive NVH, maintaining a proper air-fuel ratio, and managing air flow through the engine can all be balanced, resulting in a more desirable outcome.

Figure 11:
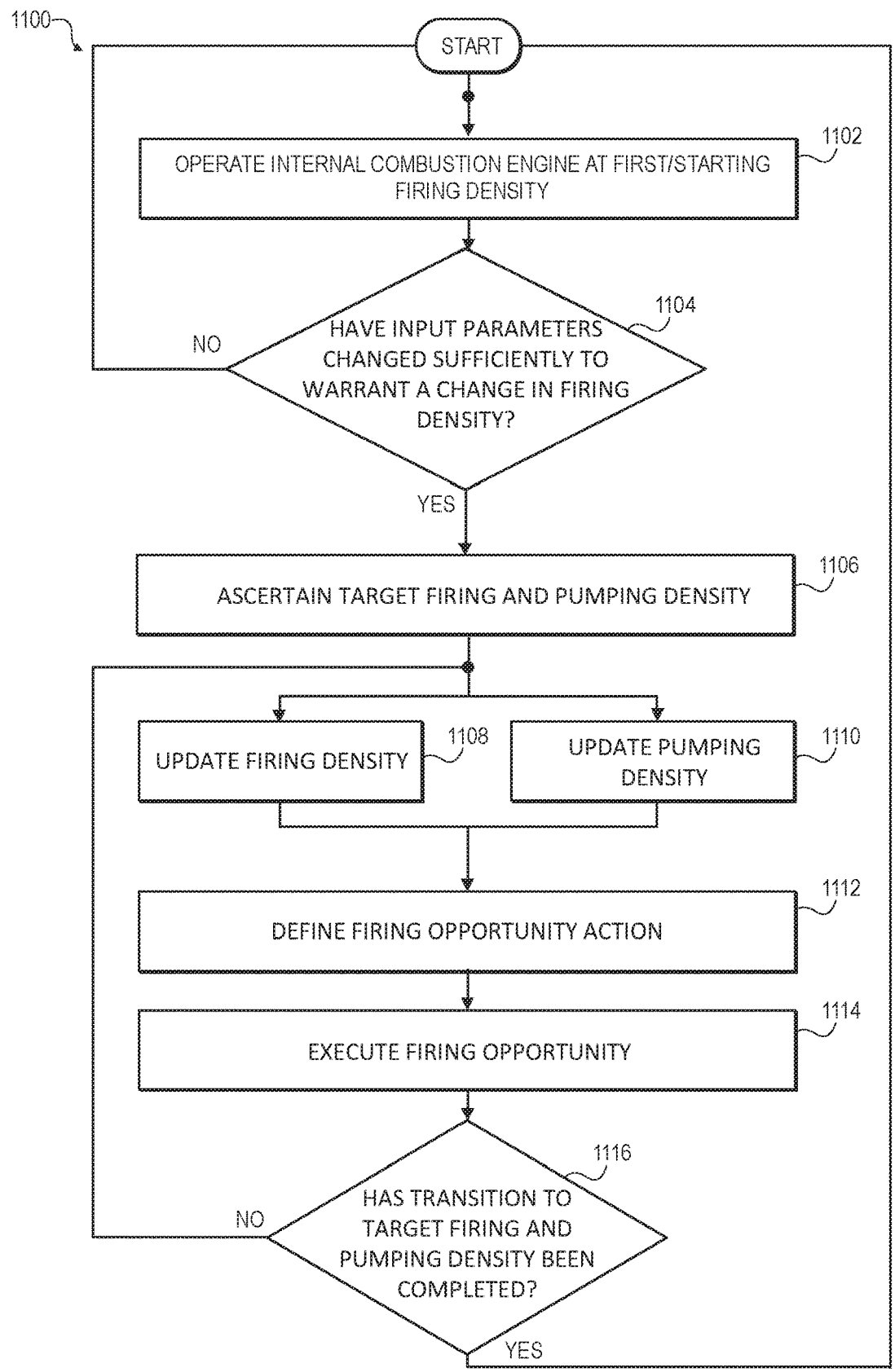
FIG. 11 is a flow chart illustrating steps for operating a lean burn internal combustion engine with separately defined firing and pumping density signals during transitions from a first firing density to a target firing density in accordance with another non-exclusive embodiment of the invention.

Referring to FIG. 11, a flow chart 1100 illustrating steps for operating a lean burn internal combustion engine with separately defined firing and pumping densities during transitions is illustrated.

In the initial step 1102, the skip fire controller 58 operates the internal combustion engine at the current (i.e., a starting or first) firing density as needed to meet the current torque demand.

In a decision 1104, the skip fire controller 58 determines if input parameters have sufficiently changed to warrant a change in the firing density. As depicted in FIG. 3, the input parameters include a torque request, an air-fuel ratio, and a signal from an aftertreatment element monitor. Additional input parameters not shown in FIG. 3 may include vehicle speed, engine speed, transmission gear ratio, oxygen sensor data, $NO_x$ sensor data, ambient air temperature, exhaust gas temperature, barometric pressure, ambient humidity, and engine coolant temperature. If the input parameters have not sufficiently changed, the skip fire controller 58 continues to operate the engine at the current firing density as provided in step 1102.

If the input parameters have sufficiently changed, then in step 1106, the skip fire controller 58 determines a new target firing and pumping density. Generally, when the firing density transition is completed, the pumping density will equal the firing density.

In steps 1108 and 1110, the skip fire controller 58 updates the firing density (step 1108) and pumping density (step 1110) for the next firing opportunity. The firing density and pumping density may follow a pre-determined trajectory through the firing density transition. That is for each firing opportunity, a value for the firing density and pumping density may be determined from a look-up table, an algorithm, or by some other means.

In step 1112 skip fire controller 58 defines the action of the next firing opportunity. That is the skip fire controller 58 determines whether the next firing opportunity will cause a cylinder associated with the firing opportunity to either (a) fire, (b) pump without firing, or (c) be deactivated.

In step 1114, the firing opportunity is executed. The cylinder associated with the firing opportunity is either (a) fired, (b) pumped but not fired or (c) deactivated, depending on the results from step 1112. Thus, for a typical 4-stroke engine, the one of the following is performed:

(1) If fired, (i) air from the intake manifold is inducted into the cylinder during the intake stroke, (ii) fuel is injected into the cylinder, (iii) the air-fuel mixture is compressed during the compression stroke, (iv) combustion occurs during the combustion stroke and (v) combustion and other gases are exhausted out of the cylinder during the exhaust stroke.

(2) If pumped but not fired, the same sequence (i) through (v) are performed, but step (ii) is omitted. With no fuel, no combustion occurs. As a result, the inducted air is pumped through the cylinder and into the exhaust manifold during the exhaust stroke; and (3) If deactivated, no fuel is injected into the cylinder and either the intake valve(s) and/or exhaust valve(s) are closed to prevent pumping of air from the intake manifold, through the engine, into the exhaust manifold.

In step 1116, it is determined if the transition to the target firing and pumping density is complete or not. If not, then the process flow moves back to steps 1108 and 1110 where the firing density and pumping density are updated for the next firing opportunity. Steps 1112, 1114, and 1116 are then repeated for the next firing opportunity. On the other hand, if the transition to the target firing density and pumping density is complete, then control is returned to step 1102. The engine operates at the target firing density until another change in the torque demand or other input condition sufficient to warrant a change in firing density is determined. Possible other input conditions that may warrant a change in firing density include, but are not limited to, changes in aftertreatment element temperature, turbocharger settings, EGR settings, and the air-fuel ratio.

It may be advantageous to operate a cylinder of the internal combustion engine as one of several different forms of gas springs during working cycles where the cylinder is deactivated. Such forms of gas springs may include, but are not limited to, a low pressure exhaust spring (LPES), a high pressure exhaust spring (HPES), or an air spring (AS). The different types of gas springs are formed by controlling the sequence of opening and closing of the intake and exhaust valves in deactivated working cycles. A low pressure exhaust spring is formed by venting the exhaust gas from a previous fired working cycle and then on an immediately subsequent working cycle closing both the intake and exhaust valves. A high pressure exhaust spring is formed by trapping the combusted exhaust gases in the cylinder during a deactivated working cycle immediately following a fired working cycle by leaving the exhaust valve closed at the end of the fired working cycle. An air spring is formed by opening the intake valve during a deactivated working cycle to induct air into the cylinder but leaving the exhaust valve closed and not firing the cylinder during that working cycle. These gas spring types are described in U.S. patent application Ser. No. 15/982,406, which is incorporated herein by reference for all purposes. It is also possible to deactivate a working cycle by closing only the intake or exhaust valve during the working cycle. In this case gas is not trapped in the cylinder through an entire deactivated working cycle but can flow back and forth between the cylinder and intake system for a closed exhaust valve or between the cylinder and the exhaust system for a closed intake valve.

Figure 12A:
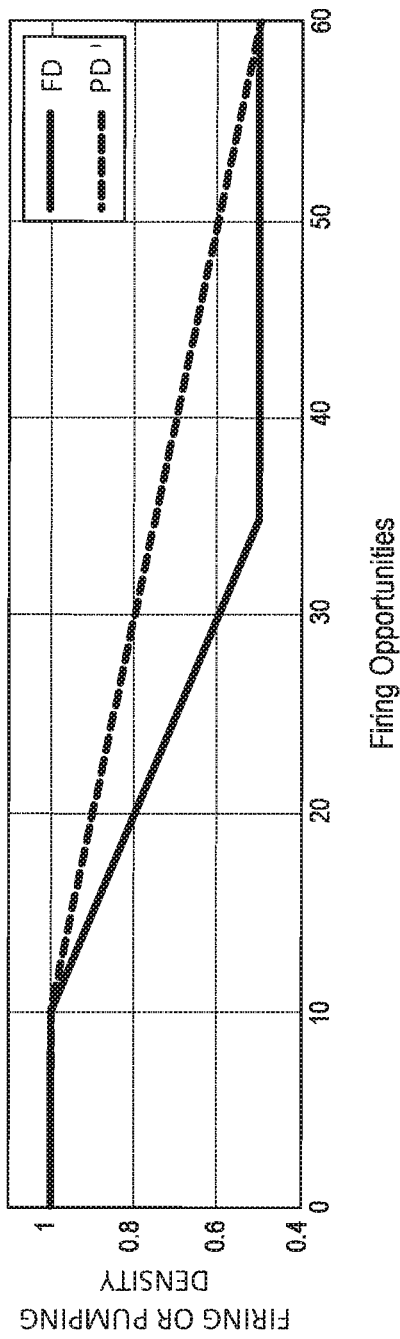
FIG. 12A illustrates a transition in the firing density and pumping density associated with transitioning a lean-burn internal combustion engine from a high firing density to a lower firing density in accordance with the present invention.
Figure 12B:
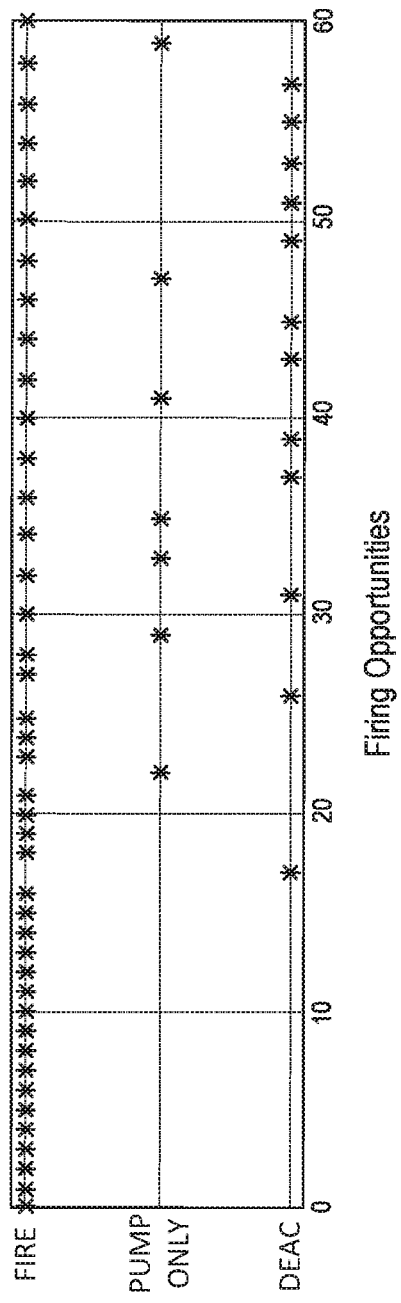
FIG. 12B illustrates an exemplary firing/pumping/deactivating pattern when transitioning a lean-burn internal combustion engine from a high firing density to a lower firing density in accordance with the present invention.

Referring to FIGS. 12A and 12B, a first example of a firing density transition from a high starting or first firing density to a lower target firing density is illustrated. In this example, the initial firing density is 1.0 and the firing density transitions to a target firing density is 0.5. This is the case where an instantaneous reduction in the number of active cylinders can cause the Air-Fuel Ratio (AFR) to be too rich due to excess EGR.

FIG. 12A is a plot showing the firing density and pumping density during the transition. Along the horizontal axis sixty (60) firing opportunities are designated. The vertical axis represents either the firing density (FD) or the pumping density (PD). The transition in the firing density and pumping density begins at the tenth firing opportunity, with both the firing density and pumping density dropping from their initial value of 1. The firing density and pumping density may follow a trajectory through the transition, which is illustrated in FIG. 12A. With the starting firing density greater than the target firing density (e.g., 1.0>0.5), the transition is characterized such that (i) the firing density trajectory transitions to a target firing density in a first time period and (ii) the pumping firing density trajectory transitions to its target pumping density in a second time period. As evident in FIG. 12A, the first time period is shorter than the second time period. In this example, the firing density drops linearly until it reaches the target firing density of 0.5 at firing opportunity 35. The firing density trajectory reaches the second firing density before the pumping density trajectory reaches its final value. The pumping density also drops linearly but has a more gradual rate of change than the firing density. The pumping density does not equal the firing density until firing opportunity 60, which is at the end of the transition in this example. By transitioning the firing density faster, NVH is reduced while continuing to meet the torque demand With the slower pumping density change, the rate of change of air flow through the internal combustion engine is slower so adjustments in the intake manifold pressure and mass of exhaust gas recirculated occur more slowly, better matching the natural time constants associated with these parameters. This causes the AFR to be closer to a desired AFR, reducing emissions and providing more fuel efficient operation.

FIG. 12B plots the action associated with each firing opportunity along the same horizontal scale as in FIG. 12A. Along the vertical axis, each of the three possible firing opportunity actions or outcomes are designated, including (1) fired, (2) pumped but not fired and (3) deactivated.

In the particular example of FIG. 12B, initially all the cylinders are fired when operating at the first or starting firing density of 1.0 and no cylinders are deactivated. During the transition, individual cylinders are either fired in accordance with the firing density, pumped in accordance with the pumping density or deactivated. For each of the sixty (60) firing opportunities, a star symbol "*" designates if the corresponding cylinder is either (1) fired, (2) pumped or (3) deactivated. In this example, there are seven firing opportunities that result in pumping over a transition length of 50 firing opportunities. The pumped firing opportunities occur more often in the vicinity of the thirtieth to fortieth firing opportunity, where the difference between the firing density and pumping density is largest. At the completion of the transition, with the engine operating at the target firing density of 0.5 and the pumping density equals the firing density, half the firing opportunities are fired, while the other half are deactivated. No firing opportunities result in pumping without firing.

Figure 13A:
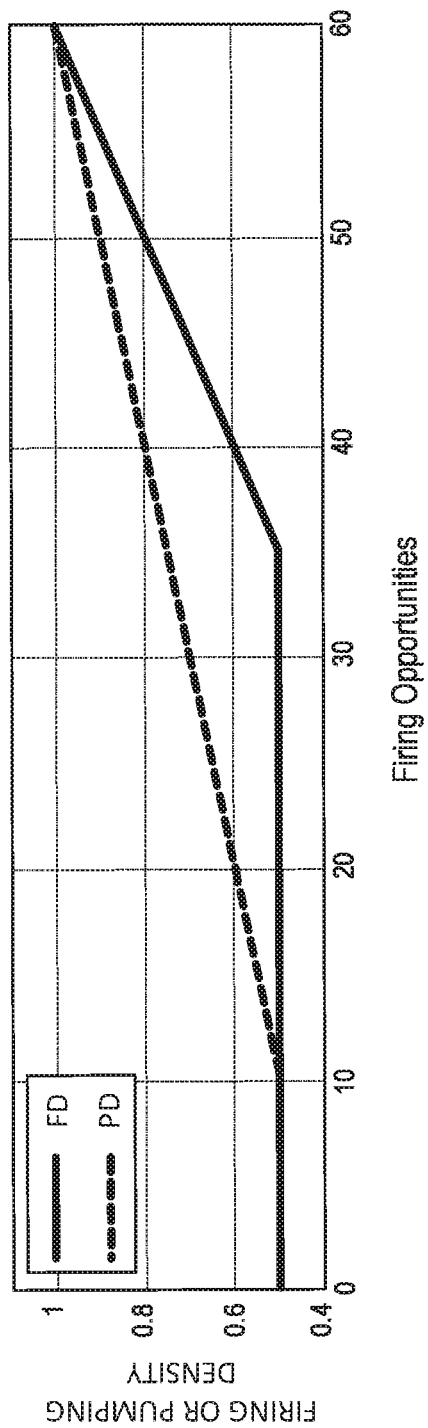
FIG. 13A illustrates a transition in the firing density and pumping density associated with transitioning a lean-burn internal combustion engine from a low firing density to a higher firing density in accordance with the present invention.
Figure 13B:
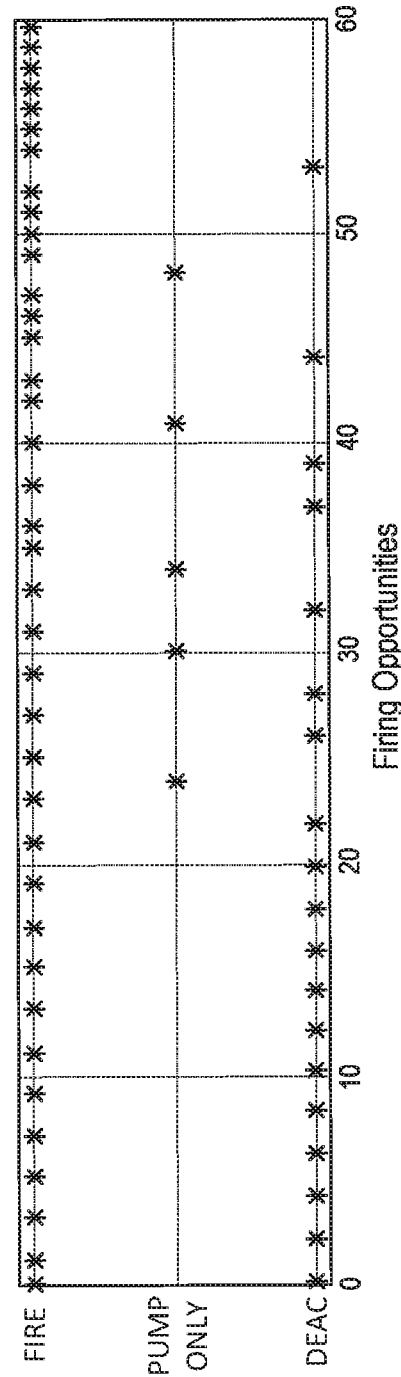
FIG. 13B illustrates an exemplary firing/pumping/deactivating pattern when transitioning a lean-burn internal combustion engine from a low firing density to a higher firing density in accordance with the present invention.

FIGS. 13A and 13B illustrates an alternative example with a firing density transition increasing through the transition. In this case the transition is from a firing density of 0.5 to 1.0. This is an example of a situation where an instantaneous change in firing density can cause the AFR to be too lean, increasing $NO_x$ emissions.

FIG. 13A plots the firing density and the pumping density versus firing opportunity during the transition. As in the previous example, the firing and pumping density may follow a trajectory through the transition. In this example, with the starting or first firing density less than the target firing density (e.g., 0.5<1.0), the transition is characterized such that (i) a change pumping density is first initiated and (ii) a change in firing density is delayed until after the initiation of the change in the pumping density. With the delay, the firing density trajectory remains at the first firing density while the pumping density trajectory transitions towards its final value. However, once the firing density starts to change, it transitions faster than the pumping density. As with transitions from a high to low firing density, the firing density trajectory transition time is again shorter than the pumping density trajectory transition time. By minimizing the time of the firing density transition, NVH associated with the transition can be minimized By spreading out the transition in the pumping density, air flow and exhaust gas recirculation ratios can better track the transition, resulting in proper torque delivery, without excessive $NO_x$ emissions or NVH.

FIG. 13B plots the action associated with each firing opportunity along the same horizontal scale as in FIG. 13A. Initially half the firing opportunities are fired, while the other half are deactivated. No firing opportunities result in pumping without firing. During the sixty (60) firing opportunities, each firing opportunity may result in a fired, pumped, or deactivated cylinder. At the completion of the transition, the engine is operating at the target firing density of 1.0, which also equals the pumping density. All firing opportunities result in the action of firing a cylinder associated with the firing opportunity.

With each of the two above described examples, the firing and deactivation of cylinders is intermixed or interspersed with the pumping of un-fueled cylinders. As a result, the conflicting demands of generating the needed torque, minimizing NVH to acceptable levels, and controlling air flow for the purpose of reducing emissions can all be balanced, resulting in a more desirable outcome for each.

Figure 14:
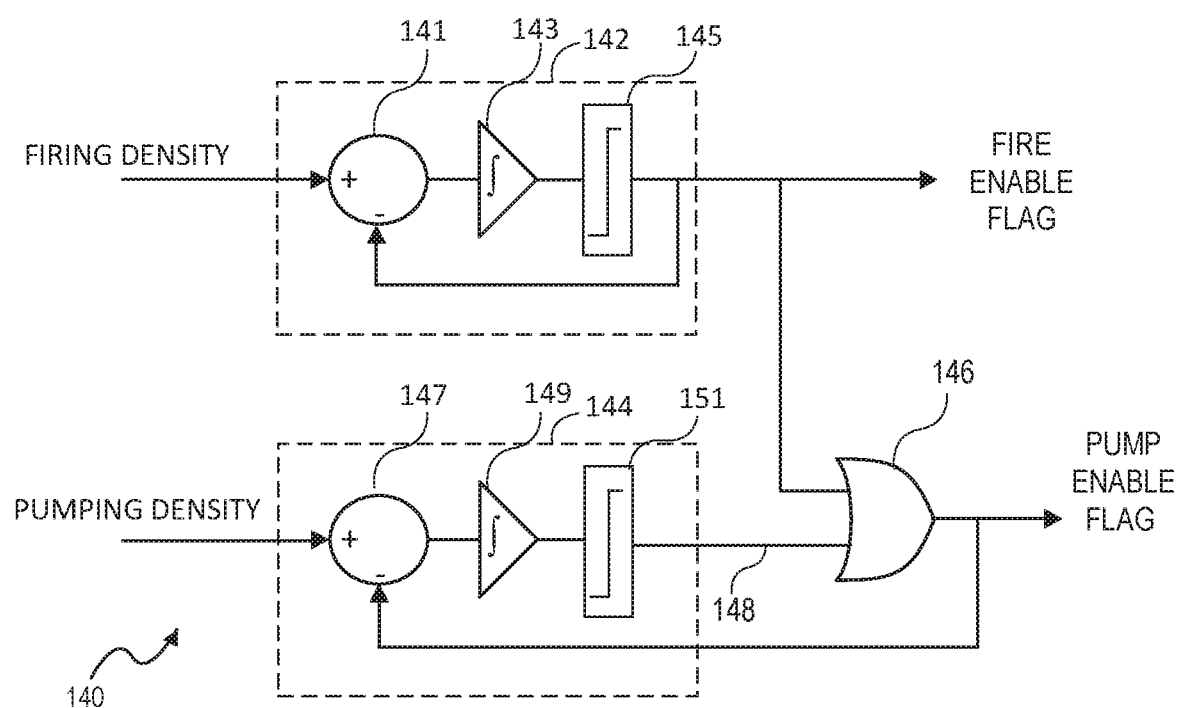
FIG. 14 is a logic diagram of a pair of sigma-delta converters for generating a firing flag and a pumping flag for a firing opportunity of a lean-burn internal combustion engine in accordance with a non-exclusive embodiment of the invention.

Referring to FIG. 14, a diagram of logic 140 for generating a cylinder Fire-Enable flag and a Pump-Enable flag in response to the firing and pumping density signals during transitions is illustrated. The logic circuit 140 includes a first sigma-delta converter 142, a second sigma delta converter 144 and a logic OR function 146. The first sigma-delta converter includes an adder 141, an integrator, or equivalently an accumulator, 143 and quantizer 145. The second sigma-delta converter includes an adder 147, an integrator, or equivalently an accumulator 149, and quantizer 151.

For each firing opportunity during a transition, the first sigma-delta converter 142 receives a firing density signal value. The value may be an analog signal that varies between 0 and 1. Examples of such signals are shown in FIGS. 12A and 13A. At every firing opportunity, the first sigma-delta converter 142 adds the received signal value to an accumulated value of previously received signal values for prior firing opportunities stored in accumulator 143. Each time the receipt of a new signal value causes the accumulated value to exceed a value of 1.0 the output quantizer 145 flips from zero to one (0 to 1), setting the Fire-Enable flag. The output of the quantizer 145 is also fed back to the adder 141, which decrements the accumulated value by 1 whenever the Fire-Enable flag is set. In this way, the Fire-Enable flag is set each time the accumulated value exceeds 1, and any left-over remainder is "rolled-over" for the next firing opportunity and kept in the accumulator 143.

In an analogous manner, the second sigma-delta converter 144 may receive a pumping density value in the form of an analog signal that varies between 0 and 1. At every firing opportunity, the second sigma-delta converter 144 adds the received signal valve to an accumulated value of previously received signal values for prior firing opportunities stored in accumulator 149. Each time the receipt of a new signal value causes the accumulated value to exceed a value of 1 the output of the quantizer 151 flips from zero to one (0 to 1), setting the intermediate Pump-Enable flag. In this way, the intermediate Pump-Enable flag 148 is set each time the accumulated value exceeds 1.

The logic OR function 146 is arranged to receive as inputs both the Fire-Enable flag and the intermediate Pump-Enable flag 148. With this arrangement, the OR function 146 generates a Pump-Enable flag when either of the two inputs is true. The Pump-Enable flag causes a cylinder associated with the firing opportunity to induct air during the working cycle. If both the Pump-Enable flag and Fire-Enable flag are set, then the firing opportunity results in firing the cylinder. If only the Pump-Enable flag is set, then air is pumped through the cylinder without a firing. If neither flag is set, then the cylinder associated with the firing opportunity is deactivated, resulting in no air induction or pumping. The output of the OR function 146 is also fed back to the adder 147, which decrements the accumulated value by 1 whenever the Pump flag is set and any left-over remainder is "rolled-over" for subsequent signal values received for the next firing opportunity.

With fired cylinders, the intake valve(s) are operated to allow induction of air and injection of fuel into the air resulting in a combustible air-fuel mixture, while the exhaust valve(s) are operated to exhaust combustion gases. With pumping, the intake and exhaust valves are operated to allow air to pass through the cylinder, but no fuel is provided. With deactivation, the intake and/or exhaust valves are closed, preventing pumping.

In one embodiment (as shown in FIG. 14), the sigma-delta converter 142, 144 are first-order sigma-delta converters. In other embodiments, the sigma-delta converters 142, 144 can be second, third or higher order sigma-delta converters. In addition, the logic 140 can be implemented in numerous ways, including but not limited to, a microprocessor, a microcontroller, programmable logic, a field programmable gate array, discreet logic circuitry, hardware, firmware, or any combination thereof. The logic 140 may be implemented with different logic elements used in different arrangements, but having the same or similar end result regarding cylinder control.

Deceleration Cylinder Cut Off (DCCO)

Deceleration Cylinder Cut Off (DCCO) occurs in certain driving situations when the driver or other autonomous or semi-autonomous driving controller makes no torque demand (e.g., the accelerator pedal is not pressed), such as when a vehicle is coasting downhill or to a stop. In DCCO, the cylinders of the engine are typically not fueled and the intake and/or exhaust valves are closed (i.e., deactivated). As a result, fuel is saved and pumping losses are reduced. Since the cylinders in DCCO operation are typically not fired over numerous consecutive firing opportunities, the air and/or re-circulated exhaust gases in the intake manifold may increase in temperature. The temperature in the intake manifold can be either measured or modeled. Either way, pumping through the engine can be used upon DCCO exit to reduce the temperature of the gases in the intake manifold on an "as needed basis".

A real-world driving scenario where a DCCO exit strategy may be beneficial is mountainous driving. When a vehicle drives up a long mountain climb, the torque demand on the engine will typically be very high for a long period of time, creating large amounts of waste heat and resulting in high engine operating temperatures. When the vehicle crests a mountain peak and begins driving down the mountain, DCCO mode may be used if no torque is demanded, as would typically be the case when coasting downhill. The DCCO operation may result in trapped gases in the intake manifold becoming excessively hot as heat from the engine is absorbed due to the lack of pumping through the engine. Thus, when a torque demand is made, such as with the start of another mountain climb, the engine may not be able to deliver the needed torque.

A possible solution to the above-described problem is to use the intake manifold gas temperature, or an estimate thereof, as a criterion if DCCO should be used or continue to be used. In the case of high intake manifold temperatures, DCCO is exited, or entry is prohibited, and instead some of the cylinders pump air. That is, while the firing density stays at zero, the pumping density is greater than zero. As a result, cooler fresh air will flow into the intake manifold, preventing heat build-up that can later limit torque production. Because pumping of cooler air corresponds to times when the engine and aftertreatment system are already hot, the induction of cooler air should not significantly impact the efficiency of the aftertreatment system. When the intake manifold gas temperature is relatively low, then DCCO can be used when appropriate.

Another constraint on DCCO use in a turbocharged Diesel engine is maintaining a minimum turbocharger rotational speed. If the turbocharger rotational speed becomes too low or rotation stops, there will be a lag in torque delivery when torque is again requested. Also, it is desirable to maintain a pressure differential across the turbocharger to avoid an increase in oil consumption due to leakage from the compressor/turbine bearings. As a result, the duration of a DCCO event may be limited. Also, the engine may be operated by interspersing deactivated firing opportunities with fired firing opportunities and firing opportunities that result in pumping air through the engine. This combination of actions associated with different firing opportunities may result in reduced fuel consumption, since fewer cylinders are fired, while maintaining an adequate turbo speed to deliver torque when it is again requested.

Gasoline Lean Burn Engines

Much of the preceding description has focused on stratified compression ignition engines, i.e. Diesel engines; however, the invention is not limited to Diesel engines. In particular, gasoline fueled engines can also operate as lean burn engines over a wide range of air/fuel ratios. Operation as a homogeneous charge lean burn engine may offer significant fuel efficiency gains when compared to stoichiometric operation. A homogenous charge engine has the in-cylinder air-fuel mixture homogenously distributed throughout the in-cylinder volume. Such an air-fuel mixture may be ignited by either spark ignition or compression ignition.

Figure 15:
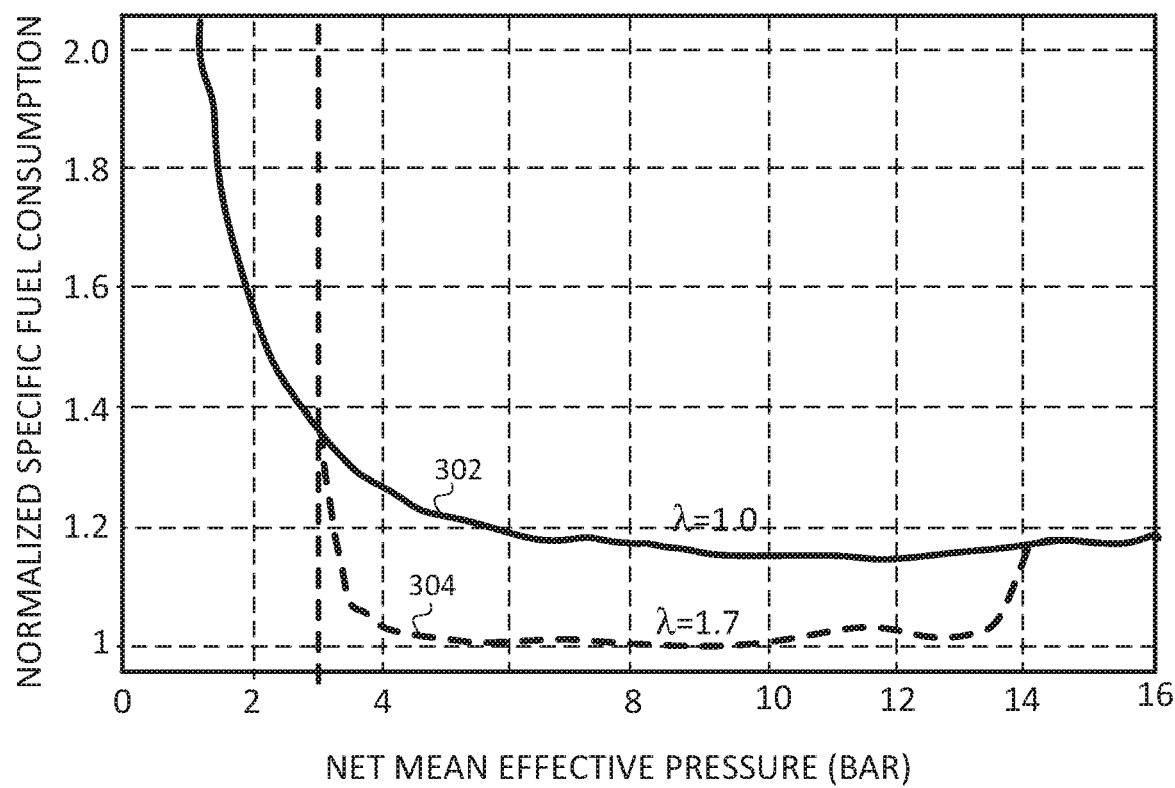
FIG. 15 is a plot of normalized specific fuel consumption versus engine torque for a gasoline fueled engine using lean burn and stoichiometric air-fuel ratios.

FIG. 15 plots normalized specific fuel consumption on the vertical axis vs. engine torque output on the horizontal axis for a gasoline fueled engine. The engine torque output is expressed in Net Mean Effective Pressure (NMEP). Data for this figure were collected with a representative boosted, 4-cylinder, 2.0 liter displacement engine operating at 2000 rpm with spark ignition. Curve 302 depicts fuel consumption for stoichiometric operation, ($\lambda$=1.0) and curve 304 depicts fuel consumption for lean burn operation, ($\lambda$=1.7). Here $\lambda$ is the air-fuel ratio relative to a stoichiometric air-fuel ratio. Values of $\lambda$ greater than 1 correspond to lean burn operation.

The plot of FIG. 15 reveals that for engine torque outputs from approximately 3 to 14 bar, fuel efficiency may be improved by operating the engine with a homogenous charge and an air-fuel ratio of $\lambda$=1.7. For an engine output below 3 bar and for an engine output above 14 bar, operation at a firing density of 1 with an air-fuel ratio of $\lambda$=1.7 is not viable. In particular, for low engine output operation (<3 bar), an air-fuel ratio of $\lambda$=1.7 is not viable due to combustion instability. For high engine output operation (>14 bar), an air-fuel ratio of $\lambda$=1.7 is not viable due to inadequate air flow to provide required torque output. Instead, within these regions (i.e., <3 bar or >14 bar) stoichiometric operation ($\lambda$=1.0) is preferred.

FIG. 15 is obtained operating at a fixed firing density of 1.0. By using firing densities less than 1, operation with a homogenous lean burn charge may be extended to engine outputs below 3 bar, improving fuel efficiency in this range. In such engines, there will be situations where transitions in the air-fuel ratio are required to meet a varying engine torque demand Such transitions may involve a simultaneous change in the air-fuel ratio and firing density. For example, to produce the same engine torque output the engine may operate at a firing density of 0.5 with a stoichiometric air-fuel ratio ($\lambda$=1.0) or at a firing density of 1.0 with a lean air-fuel ratio of approximately 25:1 ($\lambda$=1.7).

When a transition from a stoichiometric air-fuel ratio to a lean-burn air-fuel ratio is desired, a firing density can be selected, in combination with an air flow adjustment. The air flow may be adjusted by means of changing intake manifold pressure, cam phase, valve lift, recirculated exhaust gas ratio, or some other means to achieve a desired air-fuel ratio from stoichiometric to a predetermined value. The intake manifold pressure may be adjusted using a throttle and/or changing the boost level provided by a turbocharger or supercharger. Fuel consumption may then be determined based on a torque request and estimated energy conversion efficiency. By having the flexibility to adjust firing density, a smooth transition of in-cylinder air-fuel ratios from one value to the another may be achieved without generating excessive spikes in exhaust emissions.

Figure 16:
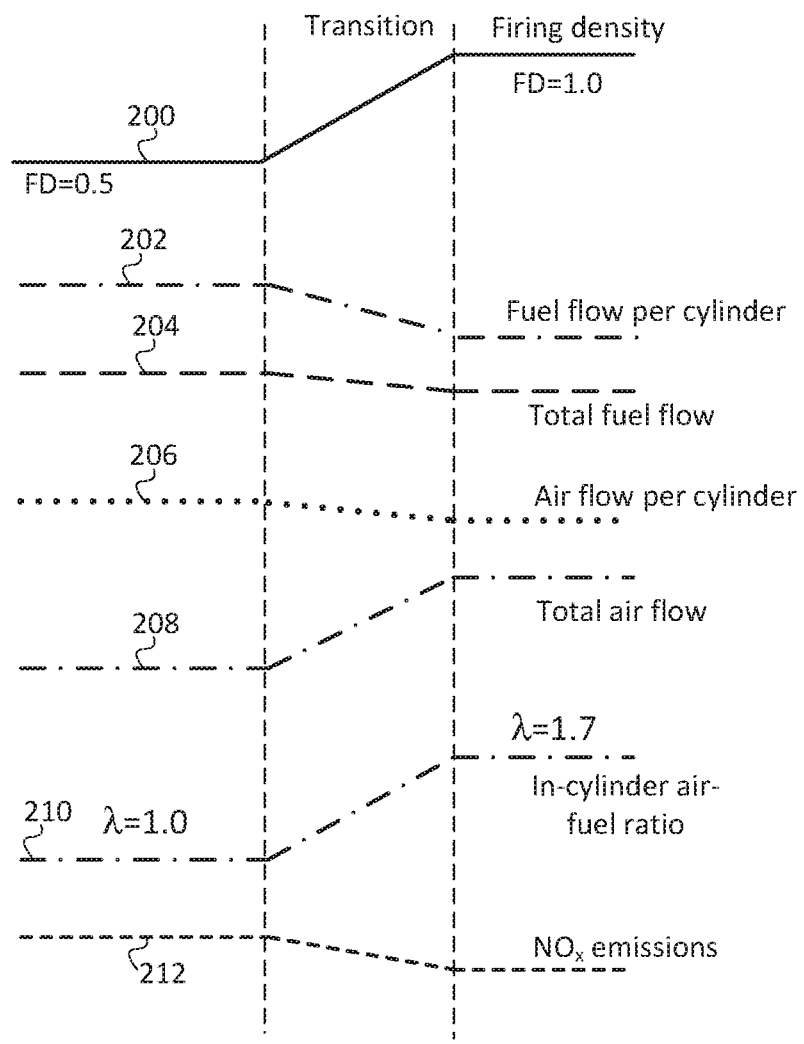
FIG. 16 is a diagram illustrating a simultaneous firing density and air-fuel ratio transition in an exemplary internal combustion engine according to a non-exclusive embodiment of the present invention.

FIG. 16 shows the behavior of various engine parameters through the exemplary transition from a firing density of 0.5 and stoichiometric air-fuel ratio ($\lambda$=1.0) to a firing density of 1.0 and a lean burn air-fuel ratio of 25:1 ($\lambda$=1.7). In this example, the requested torque is assumed to be substantially constant through the transition, so the engine is controlled to deliver substantially constant torque through the change in the firing density.

Curve 200 illustrates the transition in firing density from a firing density of 0.5 to a firing density of 1. The firing density transitions in a linear manner in the transition region; however, this is not a requirement.

Curve 202 illustrates the fuel flow per firing cylinder through the transition. The fuel flow per firing cylinder drops by almost half, since firing event frequency has double at the end of the transition compared to the beginning of the transition. By contrast, the total engine fuel flow curve 204 is either constant or substantially constant through the transition. In this case it drops slightly since the engine is slightly more efficient operating at a firing density of 1 as compared to a firing density of 0.5. This reflects the efficiency gain associated with lean burn operation depicted in FIG. 15.

Curve 206 illustrates the air flow per firing cylinder. The per cylinder air flow drops slightly through the transition.

By contrast, the total engine air flow, curve 208, approximately doubles through the transition. Since in this case the ratio between the initial air-fuel ratio and final air-fuel ratio is 1.7 the ratio between the initial and final air flow will be approximately this value as well. Adjustments to the ratio of total initial to final air flow may be made based on different energy conversion efficiencies associated with different operating conditions.

Curve 210 illustrates the change in the air-fuel ratio from its initial value of $\lambda$=1.0 to its final value of $\lambda$=1.7. The change in air-fuel ratio between the first initial air-fuel ratio and the second final air-fuel ratio is made gradually through the transition.

Curve 212 illustrates that $NO_x$ emissions remain at a low level throughout the transition.

Alternative Embodiments

With certain embodiments of the skip fire controller 58, a decision to fire or not fire a given cylinder of an engine is made dynamically, meaning on a firing opportunity-by-firing opportunity basis. In other words, prior to the firing of each cylinder of an engine, a decision is made to either fire or skip the firing opportunity. Similarly, with certain embodiments of the valve deactivation controller 102, a decision to either allow or prevent pumping can be dynamically made on firing opportunity by firing opportunity basis.

The intake and exhaust valve control may be more complex than simple binary control, i.e. open or closed. Variable lift valves may be used and/or the valve opening/closing timing may be adjusted by a cam phaser. These actuators allow limited control of cylinder MAC without use of a throttle and its associated pumping losses. Advantageously adjustment of the cylinder MAC allows control of the air-fuel ratio for a fixed fuel charge. The combustion conditions may then be optimized for improved fuel efficiency or to provide other desired conditions, i.e. temperature, pollutant emission levels, etc., in the combustion exhaust gases.

The invention has been described primarily in the context of controlling the firing of 4-stroke, compression ignition, piston engines suitable for use in motor vehicles. The compression ignition may use a stratified fuel charge, a homogeneous fuel charge, a partial homogeneous charge, or some other type of fuel charge. However, it should be appreciated that the described skip fire approaches are very well suited for use in a wide variety of internal combustion engines, including gasoline and/or spark-ignition (SI) type engines. In addition, any of the engines described herein may be used for virtually any type of vehicle—including cars, trucks, locomotives, ships, boats, construction equipment, aircraft, motorcycles, scooters, etc.; and virtually any other application that involves the firing of cylinders and utilizes an internal combustion engine.

Although only a few embodiments have been described in detail, it should be appreciated that the present application may be implemented in many other forms without departing from the spirit or scope of the disclosure provided herein. For example, as described above two sigma-delta converters are used in the determination of an action associated with a firing opportunity in a firing density transition. This is not a requirement. In one non-exclusive embodiment, the skip fire controller 58 may rely on one or more look up tables for obtaining the action associated with any given firing opportunity. For a given starting and target firing density combination, the look up table may provide possible firing patterns and the pumping patterns associated with each firing density transition. The invention described herein may be applied when both the starting and target firing densities in a firing density transition are non-zero and may also be applied when one of the starting or target firing densities is zero, i.e. all cylinders skipped. Therefore, the present embodiments should be considered illustrative and not restrictive and is not to be limited to the details given herein but may be modified within the scope and equivalents of the appended claims.

What is claimed is:

1. An engine controller in a vehicle for controlling a lean burn internal combustion engine having a plurality of working chambers, each working chamber being configured to operate in a series of working cycles each having an associated firing opportunity, the controller configured to:
   direct operation of the internal combustion engine at a first firing density suitable to meet a first torque demand for the internal combustion engine;
   determine a target firing density suitable to meet a requested torque demand for the internal combustion engine;
   determine an intermediate firing density associated with a transition from the first firing density to the target firing density;
   determine a pumping density associated with the transition from the first firing density to the target firing density;
   direct operation of the internal combustion engine during the transition by:
   selectively firing or not firing each working chamber firing opportunity in accordance with the determined intermediate firing density;
   for each working cycle which is not fired, selectively either (a) pumping or (b) not pumping air through the associated working chamber in accordance with the determined pumping density, whereby some of the working cycles that are not fired pump air through the associated working chamber and others of the working cycles that are not fired do not pump air through the associated working chamber during the transition from the first firing density to the target firing density.

2. The engine controller of claim 1, wherein the intermediate firing density and the pumping density through the transition are determined to meet the requested torque demand, while balancing the demands of operation at an acceptable Noise, Vibration and Harshness (NVH) level and minimizing exhaust emissions.

3. The engine controller of claim 1, further configured to separately adjust: the intermediate firing density to mitigate excessive NVH; and the pumping density to mitigate excessive emissions caused by too much or too little air flow through the internal combustion engine.

4. The engine controller of claim 1, when the first firing density is greater than the target firing density, further configured to: transition the intermediate firing density from the first firing density to the target firing density in less time than transitioning the pumping density, wherein: (a) the faster transition of the intermediate firing density reduces NVH; and (b) the slower transition of the pumping density reduces the rate of change of air flow through the internal combustion engine.

5. The engine controller of claim 1, when the first firing density is less than the target firing density, further configured to (a) start a transition in the pumping density; and (b) delay a transition from the first firing density until after the transition in the pumping density has started.

6. The engine controller of claim 1, wherein the fuel injection pattern changes during the transition from the first firing density to the target firing density.

7. The engine controller of claim 1, wherein the determined pumping density is used to at least partially control air mass and/or re-circulated exhaust gases that is/are pumped through the internal combustion engine from an air intake manifold.

8. The engine controller of claim 1, wherein an air mass and/or re-circulated exhaust gas that is/are pumped through the internal combustion engine is proportional to the pumping density.

9. The engine controller of claim 1, further comprising a first sigma-delta converter arranged to generate a fire-enable flag for each working cycle fire command in accordance with the determined firing density.

10. The engine controller of claim 9, further comprising a second sigma-delta converter arranged to generate an intermediate pump-enable flag for each working cycle pump command in accordance with the determined pumping density.

11. The engine controller of claim 10, further comprising a logical OR function for performing a logical OR operation between the fire-enable flag and the intermediate pump-enable flag to generate a pump-enable flag when either or both the intermediate pump-enable flag or the fire-enable flag are logically true.

12. The engine controller of claim 11, wherein the logical OR function is further configured to cause a firing opportunity to result in deactivation of the working chamber associated with the firing opportunity when both the intermediate Pump Enable flag and the Fire Enable flag are logically false.

13. The engine controller of claim 1 further configured upon exiting a Deceleration Cylinder Cut Off (DCCO) event, to increase the pumping density to induce more pumping of air through the internal combustion engine.

14. The engine controller of claim 1 wherein the determined pumping density is greater than the determined intermediate firing density for some firing opportunities in the transition.

15. The engine controller of claim 1, further comprising determining the intermediate firing density during the transition from the first firing density to the target firing density on a firing opportunity by firing opportunity basis.

16. The engine controller of claim 1, further comprising determining the pumping density during the transition from the first firing density to the target firing density on a firing opportunity by firing opportunity basis.

17. An engine controller arranged to operate a lean burn internal combustion engine in a skip fire mode for selectively firing or not firing individual working chambers among a plurality of working chambers during individual working cycles, wherein the engine controller, in response to a torque request, is configured to define a firing density trajectory and to define a pumping density trajectory when transitioning from a first firing density to a second firing density that is different than the first firing density, the defined firing density trajectory (a) meeting the torque request and (b) generating an acceptable level of Noise, Vibration and Harshness (NVH), while the defined pumping density trajectory controls a rate of pumping of air through the internal combustion engine during non-fired working chamber cycles.

18. The engine controller of claim 17, further configured so that when the first firing density is greater than the second firing density, the transition is characterized by the firing density trajectory reaching the second firing density before the pumping density trajectory reaches its final value.

19. The engine controller of claim 17, further configured so that when the first firing density is less than the second firing density, the transition is characterized by the firing density trajectory remaining at the first firing density while the pumping density trajectory transitions towards its final value.

20. The engine controller of claim 17, further comprising a first sigma-delta converter for generating a fire-enable flag in accordance with the firing density trajectory.

21. The engine controller of claim 20, further comprising a second sigma-delta converter for generating an intermediate pump-enable flag in accordance with the pumping density trajectory.

22. The engine controller of claim 21, further comprising an OR function for generating a pump-enable flag, the OR function receiving (a) the fire-enable flag and (b) the intermediate pump-enable flag and generating the pump-enable flag when either (a) or (b) are true.

23. The engine controller of claim 22, further configured to deactivate the non-fired working chambers during firing opportunities when the pump-enable flag is not set.

24. The engine controller of claim 17, further configured so that a firing density trajectory transition time is shorter than a pumping density trajectory transition time.

25. A method of transitioning a firing density in a skip fire controlled internal combustion engine from a first firing density to a target second firing density different than the first firing density in response to a change in an input parameter, the method comprising:
    causing at least one first firing opportunity during the transition to be a fired firing opportunity;
    selecting at least one second firing opportunity during the transition to be a pumped firing opportunity wherein air is pumped through an engine working chamber associated with the second firing opportunity without combusting the air; and
    selecting at least one third firing opportunity during the transition to be a deactivated firing opportunity wherein no air is pumped through an engine working chamber associated with the third firing opportunity.

26. The method as recited in claim 25, wherein the input parameter is selected from the group consisting of a torque request, an air-fuel ratio request, an aftertreatment element signal, a vehicle speed, an engine speed, a transmission gear ratio, an oxygen sensor signal, $NO_x$ sensor signal, an ambient air temperature signal, an exhaust gas temperature signal, a catalyst temperature signal, a barometric pressure signal, an ambient humidity signal, and an engine coolant temperature signal.

27. The method as recited in claim 25, wherein during the transition, either: (i) the pumping density is greater than the second firing density; or (ii) the pumping density and the second firing density are the same.

28. The method as recited in claim 25, wherein the internal combustion engine is a lean burn engine.

29. The method as recited in claim 25, wherein the internal combustion engine is a compression-ignition engine.

30. The method as recited in claim 25, wherein the fired, pumped, and deactivated firing opportunities are interspersed through the transition.

31. The method as recited in claim 25, wherein a pattern of fired, pumped, and deactivated firing opportunities during the transition is determined at least in part by a sigma-delta converter.

32. The method as recited in claim 25, wherein a pattern of fired, pumped, and deactivated firing opportunities during the transition is determined at least in part by a look-up table.

33. A method of making a transition in a firing density in a skip fire controlled, gasoline-fueled, internal combustion engine, the method comprising:
    operating at a first firing density and an associated first air-fuel ratio;
    initiating a transition to a second firing density, the second firing density being different than the first firing density and having an associated second air-fuel ratio;
    wherein the second air-fuel ratio is different than the first air-fuel ratio; and
    gradually changing the air-fuel ratio between the first air-fuel ratio and the second air-fuel ratio through the transition.

34. The method as recited in claim 33, wherein one of the first air-fuel ratio or the second air-fuel ratio is a stoichiometric air-fuel ratio.

35. The method as recited in claim 33, wherein one of the first air-fuel ratio or the second air-fuel ratio is a lean burn air-fuel ratio.

36. The method as recited in claim 33, further comprising operating the internal combustion engine with spark ignition at the first firing density or the second firing density.

37. The method as recited in claim 33, further comprising operating the internal combustion engine with spark ignition at both of the first firing density and at the second firing density.

38. The method as recited in claim 33, further comprising operating the internal combustion engine with compression ignition at the first firing density and spark ignition at the second firing density.

39. A method of making a transition in a firing density in a skip fire controlled, gasoline-fueled, internal combustion engine, the method comprising:
- operating at a first firing density and an associated first air-fuel ratio;
- initiating a transition to a second firing density, the second firing density being different than the first firing density and having an associated second air-fuel ratio;
- wherein the second air-fuel ratio is different than the first air-fuel ratio; and
- forming a homogenous charge within a working chamber of the internal combustion engine when operating with a lean burn air-fuel ratio, wherein the lean burn air-fuel ratio is one of either the first air-fuel ratio or the second air-fuel ratio.

40. A method of making a transition in a firing density in a skip fire controlled, gasoline-fueled, internal combustion engine, the method comprising:
- operating at a first firing density and an associated first air-fuel ratio;
- initiating a transition to a second firing density, the second firing density being different than the first firing density and having an associated second air-fuel ratio;
- wherein the second air-fuel ratio is different than the first air-fuel ratio; and
- operating the internal combustion engine with compression ignition at the first firing density and spark ignition at the second firing density.

* * * * *